US010437300B2

(12) United States Patent
Kaechi

(10) Patent No.: US 10,437,300 B2
(45) Date of Patent: Oct. 8, 2019

(54) ELECTRONIC DEVICE AND CONTROL METHOD THEREFOR

(71) Applicant: CANON KABUSHIKI KAISHA, Tokyo (JP)

(72) Inventor: Shuya Kaechi, Hashimoto (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 191 days.

(21) Appl. No.: 15/683,133

(22) Filed: Aug. 22, 2017

(65) Prior Publication Data

US 2018/0059750 A1    Mar. 1, 2018

(30) Foreign Application Priority Data

Aug. 24, 2016 (JP) .................................. 2016-164061

(51) Int. Cl.
```
G06F 1/00      (2006.01)
G06F 1/26      (2006.01)
H02J 7/00      (2006.01)
```
(52) U.S. Cl.
CPC .............. *G06F 1/26* (2013.01); *H02J 7/0054* (2013.01); *G06F 1/266* (2013.01); *H02J 2007/0062* (2013.01)

(58) Field of Classification Search
CPC .......... G06F 1/26; G06F 1/266; H02J 7/0054; H02J 2007/0062
See application file for complete search history.

(56) References Cited

U.S. PATENT DOCUMENTS

| | | | |
|---|---|---|---|
| 6,498,957 B1 * | 12/2002 | Umetsu ..................... | G06F 1/26 320/117 |
| 9,760,747 B2 | 9/2017 | Kaechi | |
| 2015/0261982 A1 | 9/2015 | Kaechi | |
| 2016/0011830 A1 * | 1/2016 | Asakura ................ | H04W 76/10 358/1.15 |
| 2016/0011887 A1 * | 1/2016 | Chung .................. | G06F 9/4416 713/2 |
| 2018/0062218 A1 | 3/2018 | Kaechi | |

FOREIGN PATENT DOCUMENTS

| | | |
|---|---|---|
| JP | 2014-509829 A | 4/2014 |
| WO | 2012/134577 A1 | 10/2012 |

OTHER PUBLICATIONS

Odaguchi, English translation of JP 2013196179 A, Sep. 30, 2013 (Year: 2013).*

* cited by examiner

*Primary Examiner* — Xuxing Chen
(74) *Attorney, Agent, or Firm* — Carter, DeLuca & Farrell LLP

(57) ABSTRACT

An electronic device has a connecting unit configured to connect to an external device by cable and receive external power from the external device, and a control unit configured to execute a predetermined function using the external power. The electronic device logically determines a power supply capability of the external device connected to the connecting unit, and determines whether the external device is capable of power supply at the logically determined power supply capability. If it is determined that the external device is not capable of power supply at the logically determined power supply capability, a prohibited state in which the predetermined function cannot be executed using the external power is set to the control unit.

17 Claims, 13 Drawing Sheets

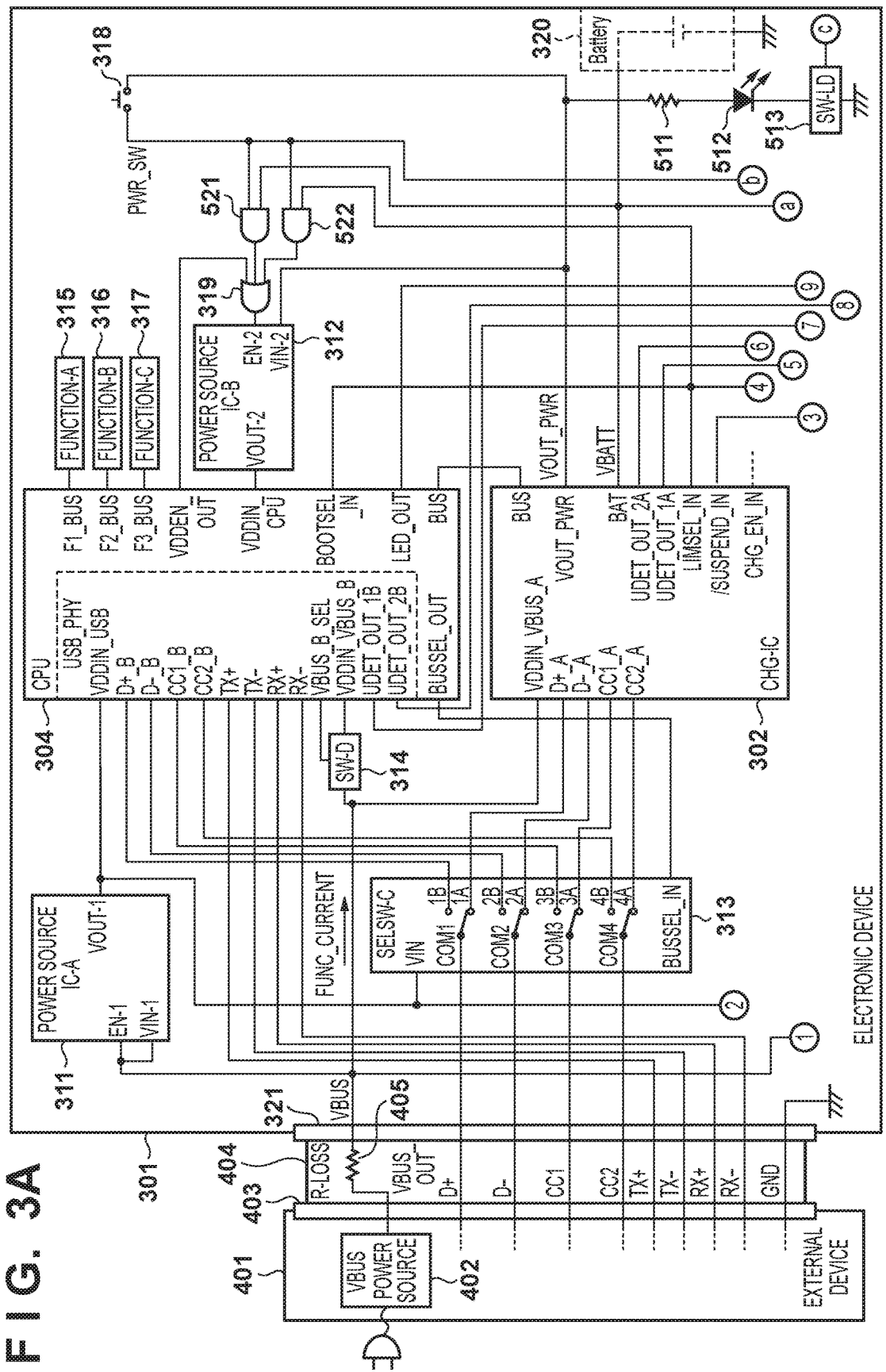

FIG. 4

| USBDET_1 | USBDET_2 | LOAD TEST CURRENT VALUE | BSEL | BSEL_EN | BOOTSEL | OPERATION WITHOUT BATTERY | CHG-IC CURRENT LIMITATION VALUE | USB CONNECTION DESTINATION DETECTION RESULT | CORRESPONDING TIMING CHART |
|---|---|---|---|---|---|---|---|---|---|
| L | L | NA | H | L | L | DISABLE | ISUSP (2.5mA) | USB CONNECTION DESTINATION UNDETECTED | FIGS. 2A, 2B, 2C PHASE0 |
| H | L | IL3 | H | L | L | DISABLE | I3(1.5A) | USB BC1.2 PROFILE (5V/1.5A) | FIGS. 2B, 2C PHASE1 |
| H | L | IL3 | L | L | L | DISABLE | I2(0.5A) | USB BC1.2 PROFILE (5V/1.5A) | FIGS. 2B, 2C PHASE1 |
| H | L | IL3 | H | H | H | ENABLE | I3(1.5A) | USB BC1.2 PROFILE (5V/1.5A) | FIG. 2B PHASE2 |
| H | L | IL3 | L | H | L | DISABLE | I2(0.5A) | USB BC1.2 PROFILE (5V/1.5A) | FIG. 2C PHASE2 |
| L | H | IL4 | H | L | L | DISABLE | I4(2.0A) | USB PD PROFILE1 (5V/2.0A) | FIGS. 5A, 5B PHASE1 |
| L | H | IL4 | L | L | L | DISABLE | I2(0.5A) | USB PD PROFILE1 (5V/2.0A) | FIGS. 5A, 5B PHASE1 |
| L | H | IL4 | H | H | H | ENABLE | I4(2.0A) | USB PD PROFILE1 (5V/2.0A) | FIG. 5A PHASE2 |
| L | H | IL4 | L | H | L | DISABLE | I2(0.5A) | USB PD PROFILE1 (5V/2.0A) | FIG. 5B PHASE2 |
| H | H | IL3 | H | L | L | DISABLE | I3(1.5A) | USB PD PROFILE2 (12V/1.5A) | FIGS. 5C, 5D PHASE1 |
| H | H | IL3 | L | L | L | DISABLE | I2(0.5A) | USB PD PROFILE2 (12V/1.5A) | FIGS. 5C, 5D PHASE1 |
| H | H | IL3 | H | H | H | ENABLE | I3(1.5A) | USB PD PROFILE2 (12V/1.5A) | FIG. 5C PHASE2 |
| H | H | IL3 | L | H | L | DISABLE | I2(0.5A) | USB PD PROFILE2 (12V/1.5A) | FIG. 5D PHASE2 |

ELECTRONIC DEVICE AND CONTROL METHOD THEREFOR

BACKGROUND OF THE INVENTION

Field of the Invention

The present invention relates to an electronic device that performs receipt of power by cable and a control method therefor.

Description of the Related Art

Electronic devices that have a USB (Universal Serial Bus) as a communication interface and are able to use power that is obtained from a VBUS line (hereinafter, VBUS) of the USB of a connected external device are known. With this type of electronic device, not only can power that is obtained from the VBUS of the external device be utilized in charging a secondary battery but it is also being increasingly utilized as an operation power source for various functions. Since the applications of power that is obtained from the VBUS of a USB are expanding in this way, it is increasingly the case that, with power supply limited to 2.5 W as per the USB 2.0 standard, the power supply serving as the operation power source of the electronic device is insufficient. In response to the demand for further improvement in power supply to electronic devices, standards such as USB BC (Battery Charging) and USB PD (Power Delivery) have been formulated, and utilization of power exceeding 7.5 W to 10 W from the VBUS has become possible.

The electronic device determines the power supply capability of the external device that is connected by performing processing such as USB connection destination detection and enumeration, and obtains power from the VBUS in accordance with the determined power supply capability. The methods for determining the power supply capability have been formulated with standards, and are logically performed by means such as the voltage of the signal line of the USB interface, communication using the signal line and communication using the VBUS.

However, the actual power that can be obtained from the external device through the VBUS may not match the logically determined power supply capability. For example, cases where the determined power supply capability of the external device is not correct due to factors such as an error at the time of executing USB connection destination detection or enumeration are conceivable. Alternatively, cases where there is significant power loss through a USB interface cable or a connector are also conceivable. In such cases, the actual power supply capability of the external device will be smaller than the power supply capability of the external device logically determined by the electronic device. In the case where the actual power supply capability of the external device is smaller than the power supply capability of the external device logically determined by the electronic device and the electronic device operates with the external power source, a failure or an error may occur during operation of the electronic device.

Japanese Patent Laid-Open No. 2014-509829 (hereinafter, Literature 1) proposes an apparatus (electronic device) having a first circuit that is disposed such that current is drawn from a charging source (external device) at a plurality of current levels and a second circuit that is disposed such that the charge current capability of the charging source is decided using the first circuit. With the apparatus described in Literature 1, charge current is drawn from the charging source and detection of a voltage drop on the input line is performed. The level of charge current is raised in the case where a voltage drop is not observed, and the level of charge current is lowered in the case where a voltage drop is observed. This enables the maximum current to be drawn from the charging source. Accordingly, the electronic device can draw the maximum current, regardless of the logically determined power supply capability.

However, Literature 1 is conditioned on maximizing the supply current in a range in which the supply voltage of the external device does not fall below a threshold, and the rating of the external device is not taken into consideration. Thus, it also became possible to draw a current exceeding 0.5 A from a 2.5 W external device having a 5V/0.5 A rating, for example, and there was a possibility of power supply exceeding the rating being executed. In the case where power supply exceeding the rating is executed, the operation of the external device becomes unstable, and there is concern that power supply to the electronic device will become unstable as a result.

SUMMARY OF THE INVENTION

According to one embodiment of the present invention, an electronic device that checks whether power can be received from a connected external device at a logically determined power supply capability and is able to stably implement operation using power supply from the external device is disclosed.

According to one aspect of the present invention, there is provided an electronic device comprising: a connecting unit configured to connect to an external device by cable and receive external power from the external device; a first determination unit configured to logically determine a power supply capability of the external device connected to the connecting unit; a second determination unit configured to determine whether the external device is capable of power supply at a power supply capability that depends on the power supply capability logically determined by the first determination unit; a control unit configured to execute a predetermined function using the external power, according to an operation state that is set; and a setting unit configured, in a case where the second determination unit determines that the external device is capable of power supply at the power supply capability that depends on the power supply capability logically determined by the first determination unit, to set, in the control unit, a permitted state in which the predetermined function can be executed using the external power, and, if not the case, to set, in the control unit, a prohibited state in which the predetermined function cannot be executed using the external power.

According to another aspect of the present invention, there is provided an electronic device comprising: a power reception unit configured to connect to an external device by cable and receive external power from the external device; a control unit configured to execute a predetermined function using the external power; and a decision unit configured to decide whether the control unit is capable of executing the predetermined function using the external power, based on a power supply capability of the external device.

According to another aspect of the present invention, there is provided a control method for an electronic device including a connecting unit configured to connect to an external device by cable and receive external power from the external device and a control unit configured to execute a predetermined function using the external power according to an operation state that is set, the method comprising:

logically determining a power supply capability of the external device connected to the connecting unit; determining whether the external device is capable of power supply at a power supply capability that depends on the logically determined power supply capability; and in a case where it is determined that the external device is capable of power supply at the power supply capability that depends on the logically determined power supply capability, setting, in the control unit, a permitted state in which the predetermined function can be executed using the external power, and, if not the case, setting, in the control unit, a prohibited state in which the predetermined function cannot be executed using the external power.

According to another aspect of the present invention, there is provided a control method for an electronic device including a power reception unit configured to connect to an external device by cable and receive external power from the external device and a control unit configured to execute a predetermined function using the external power, the method comprising: determining a power supply capability of the external device; and deciding whether the control unit is capable of executing the predetermined function using the external power, based on the power supply capability of the external device.

Further features of the present invention will become apparent from the following description of exemplary embodiments (with reference to the attached drawings).

BRIEF DESCRIPTION OF THE DRAWINGS

FIGS. 3A and 3B are block diagrams showing an exemplary configuration of the electronic device according to the first embodiment.

FIG. 4 is a diagram showing the relationship between operating conditions and load test results of the electronic device according to the first embodiment.

DESCRIPTION OF THE EMBODIMENTS

Hereinafter, the embodiments of the present invention will be described with reference to the appended drawings. The present invention is, however, not limited to the following embodiments.

First Embodiment

In a first embodiment, the electronic device performs connection destination detection of an external device connected as a power transmission side apparatus and power supply capability determination by a current load test with conditions based on the result of connection destination detection. In connection destination detection, the power supply capability of the connected external device is logically determined. In the case where the result of connection destination detection matches the result of power supply capability determination, the electronic device sets whether operation without a secondary battery is possible with a power condition that is based on the result of connection destination detection. Note that, in the present embodiment, USB is used for the connection with the external device, and logical determination of the power supply capability of the external device is also called USB connection destination detection. Also, a portable terminal such as a smartphone or a digital camera, for example is given as the electronic device. Also, a PC (personal computer), a charging adapter or the like that is able to charge the electronic device using a USB interface is given as the external device.

Figure 3B:
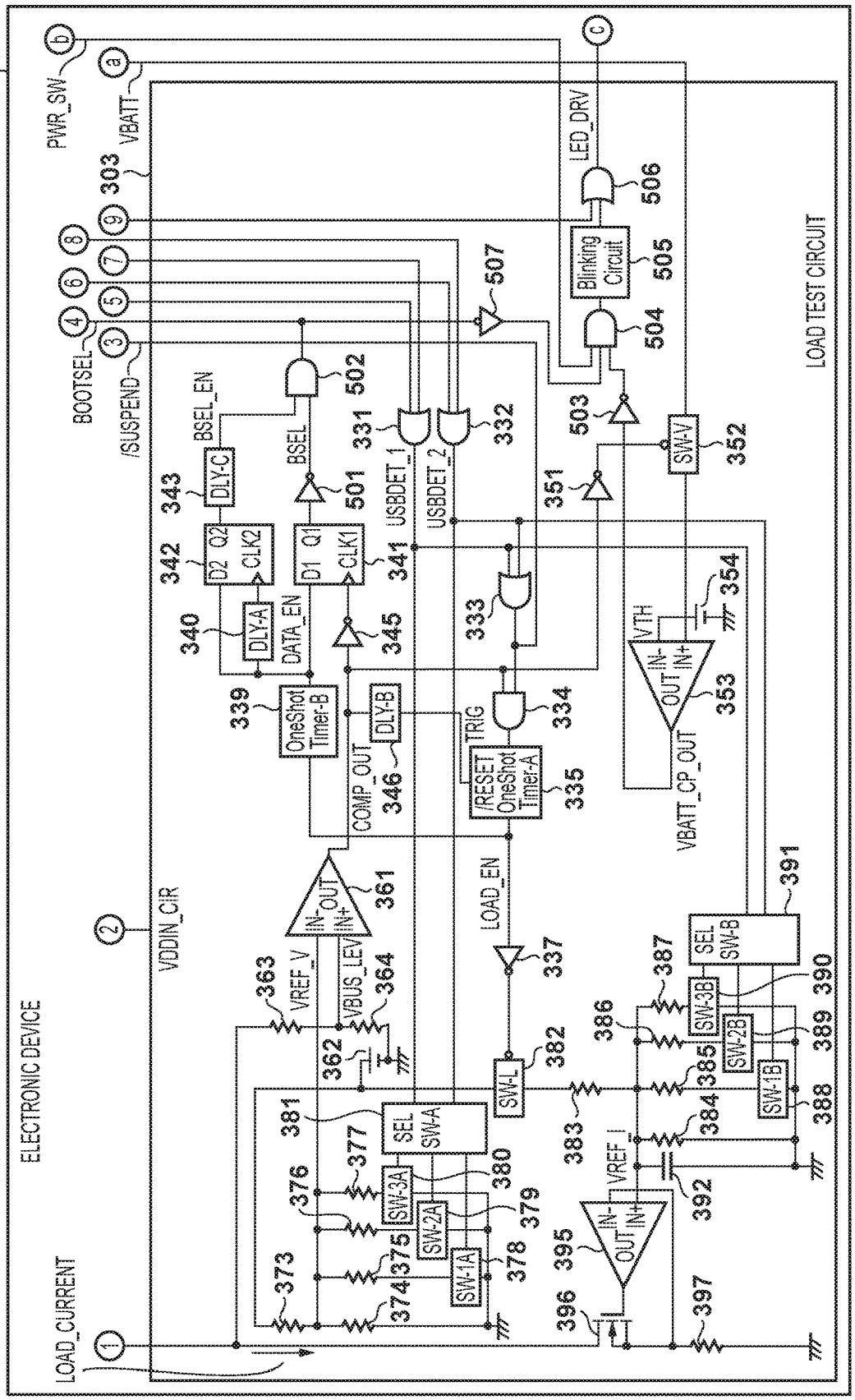

First, the configuration of the electronic device according to the first embodiment will be described, with reference to FIG. 3A and FIG. 3B. FIGS. 3A and 3B are block diagrams showing an exemplary configuration of the electronic device according to the first embodiment. Note that, in FIGS. 3A and 3B, blocks not required in the description of the present embodiment and the power source connections to such blocks are omitted.

In FIGS. 3A and 3B, an external device 401 is an apparatus in which power supply by cable to the electronic device 301 is possible. The external device 401 and the electronic device 301 are connected by USB, for example. The external device 401 may be an apparatus that is only capable of power supply or an apparatus provided with functions other than power supply. Also, the USB standard that is supported by the external device 401 may be any of USB 2.0, USB 3.0, USB 3.1, USB BC and USB PD. Hereinafter, the case where the electronic device 301 uses power supply by USB BC or USB PD will be described, but the present invention is not limited thereto.

In the external device 401, the VBUS power source 402 is the power source of a VBUS that supplies power to the electronic device 301 from the external device 401. As power of a VBUS power source 402, power that is supplied from outside the external device 401 may be used, or power that is supplied from a battery provided inside the external device 401 may be used. A USB connector 403 is a connector that supports the USB standard. A USB interface cable 404 is a cable that connects the external device 401 and a USB interface of the electronic device 301. A cable loss R-LOSS 405 illustrates resistance loss that occurs on the VBUS line of the USB interface cable 404 and loss including a contact resistance component of the USB connector 403.

The electronic device 301 is able to receive power from the external device 401 (from the VBUS line of the USB) by cable. In the present embodiment, the electronic device 301 and the external device 401 respectively have USB connectors 321 and 403, and are connected by the USB interface cable 404. The USB connectors 321 and 403 are one example of a communication means that has a power reception unit (VBUS) that receives power by cable from the external device 401. Accordingly, in the block diagrams of FIGS. 3A and 3B, the USB connectors 321 and 403 do not limit the apparatus configurations of the electronic device 301 and the external device 401, and may be interfaces of other standards. Also, because the various signals of USB interfaces are well known, a detailed description thereof is omitted.

A CPU 304 is a processor that administers control of the electronic device 301. The CPU 304 contains memories such as a RAM (Random Access Memory) that is used as a work area and a ROM (Read Only Memory) that stores processing procedures. A main function of the CPU 304 operates using a voltage that is supplied to VDDIN_CPU. Also, USB_PHY, which is a USB function of the CPU 304, can operate independently from the main function, using a voltage that is supplied to VDDIN_USB. The USB function (USB_PHY) of the CPU 304 is able to operate with lower power than the main function, and is provided with a USB connection destination detection function and a USB signal processing function. With the USB connection destination detection function, it is determined whether the external device connected to the electronic device 301 supports any of USB 2.0, USB 3.0, USB 3.1, USB BC and USB PD using logical detection and/or using communication of VBUS, D+, D− and CC signals. A USB signal processing function executes communication via USB.

A CHG-IC 302 is a charge control IC that controls charging of the battery 320. The CHG-IC 302 is provided with a function for converting a voltage input VDDIN_VBUS_A into a constant voltage output VOUT_PWR and supplying the voltage output to a power source IC-B 312 and the like. The CHG-IC 302 executes these functions using the voltage input VDDIN_VBUS_A from outside. Furthermore, the CHG-IC 302 has a function for receiving input (VBAT) of a battery 320 and outputting the input as VOUT_PWR to the power source IC-B 312 and the like, in the case where there is no voltage input VDDIN_VBUS_A from outside. Also, the CHG-IC 302 is provided with a similar USB connection destination detection function to the CPU 304. The CHG-IC 302 is connected to the CPU 304 with a BUS. The CPU 304 obtains the state of the CHG-IC 302 and controls operation of the CHG-IC 302, by communication using the BUS.

The battery 320 is, for example, a single cell lithium-ion secondary battery that is removable from the electronic device 301, and outputs power (VBATT) for operating the electronic device 301. A power source IC-A 311 is a power source IC that converts a voltage input VIN-1 into a constant voltage output VOUT-1, and provides a power source (VDDIN_USB) for operating the USB function (USB_PHY) of the CPU 304. In the power source IC-A 311, ON and OFF of output of the output VOUT-1 is controlled by a control signal EN-1. In the present embodiment, both EN-1 and VIN-1 are connected to the VBUS. Accordingly, upon power being supplied to the VBUS from the external device 401, the power source IC-A 311 supplies the constant voltage output VOUT-1 to the VDDIN_USB of the CPU 304. The power source IC-B 312 is a power source IC that converts a voltage input VIN-2 from outside into a constant voltage output VOUT-2, and supplies the voltage output to the VDDIN_CPU of the CPU 304. In the power source IC-B 312, ON and OFF of output of the output VOUT-2 is controlled by a control signal EN-2.

A SELSW-C 313 is a selector switch that switches connection of signal lines (D+, D−, CC1, CC2) that are used in USB connection destination detection to the CPU 304 side or the CHG-IC 302 side. The SELSW-C 313 switches the connection in accordance with a BUSSEL_IN signal from the CPU 304 (BUSSEL_OUT). In an initial state of the SELSW-C 313, however, the signals that are used in USB connection destination detection are connected to the CHG-IC 302 side, and USB connection destination detection is performed with the CHG-IC 302. Note that, as described above, USB connection destination detection is also executable with the CPU 304. Accordingly, a configuration may be adopted in which USB connection destination detection is performed with the CPU 304, by connecting the signals that are used in USB connection destination detection to the CPU 304 side in the initial state of the SELSW-C 313.

A function current (FUNC_CURRENT) flows to the CPU 304 and the CHG-IC 302, using power that is supplied via the VBUS from the external device 401 which serves as the power transmission side apparatus. A SW-D 314 is a switch that switches whether to connect power supplied from an external device via the VBUS to the USB function (USB_PHY) of the CPU 304. The USB connector 321 is a connector that supports the USB standard. Because the connector configuration of the electronic device 301 is not limited, definition of the USB connector 321 is omitted. Also, because the signals of the USB interface on the electronic device 301 side are well known, description of the respective signals is omitted.

A FUNCTION-A 315, a FUNCTION-B 316 and a FUNCTION-C 317 are functional units that are each controlled by the CPU 304. The FUNCTION-A 315 is, for example, an image capturing functional unit of the electronic device 301 that is constituted by an optical unit that is constituted by a lens and a drive system of the lens, an image sensor, an image capturing processing unit that converts video captured with the image sensor into digital data, and the like. The FUNCTION-B 316 is, for example, a recording unit capable of mounting a flash memory card that is able to perform writing and reading of digital data. The FUNCTION-C 317 is, for example, a display functional unit that is constituted by an LCD (liquid crystal display) that is able to display operating information of the electronic device 301, video and the like. The functions of the FUNCTION-A 315, the FUNCTION-B 316 and the FUNCTION-C 317 are not limited to the above, and the number of functional units is also not limited to three.

A button switch 318 is a power source button switch for starting operation of the main function of the CPU 304 of the electronic device 301. Upon the button switch 318 being pressed, the VOUT_PWR signal and a PWR_SW signal are activated. That is, upon the button switch 318 being pressed, the constant voltage output VOUT_PWR output from the CHG-IC 302 is output to other circuits as the PWR_SW signal. The PWR_SW signal is OR-connected to a VDDEN_OUT signal of the CPU 304 with an OR 319 via an AND 521 and an AND 522. The electronic device 301 is able to turn ON the power source IC-B 312 with input of one of the PWR_SW signal or the VDDEN_OUT signal of the CPU 304. The operations of the AND 521 and the AND 522 between the OR 319 and the button switch 318 will be discussed later. Note that the button switch 318 is an example of an operating switch, and may be another form of switch.

A load test circuit 303 is a circuit that implements the current load test under conditions (load current and voltage threshold) set based on the USB connection destination detection result, and determines the power supply capability of the external device 401. The load test circuit 303 determines whether the external device is capable of supplying power, at a power supply capability that depends on the logically determined power supply capability of the external device, based on a result of USB connection destination detection. The load test circuit 303 obtains a power source VDDIN_CIR for the entirety thereof from the output VOUT-1 of the power source IC-A 311. Accordingly, power is constantly supplied to the load test circuit 303 for the duration that power is supplied to the VBUS from the external device. In the load test circuit 303, in the case where supply is started from a state where the power source VDDIN_CIR is not being supplied, the logic of each circuit of the load test circuit 303 which will be described later is set to an initial state and the functions thereof are negated.

Also, in the load test circuit 303, in the case where supply is ended in a state where the power source VDDIN_CIR is being supplied, the functions of each circuit of the load test circuit 303 which will be discussed later are negated. Also, description of the transient state of each circuit that is not required in description according to the present embodiment is omitted.

The USB connection destination detection result may be received by either the CPU 304 or the CHG-IC 302. The USB connection destination detection result of the CPU 304 is output from an UDET_OUT_1B and an UDET_OUT_2B, and received with an OR 331 and an OR 332 of the load test circuit 303. Also, the USB connection destination detection result of the CHG-IC 302 is output from an UDET_OUT_1A and an UDET_OUT_2A, and received by the OR 331 and the OR 332 of the load test circuit 303. The output (USBDET_1) of the OR 331 and the output (USBDET_2) of the OR 332 are connected to the inputs of an OR 333, a SELSW-A 381 and a SELSW-B 391.

An output (/SUSPEND) of the OR 333 is connected to the input of an AND 334 and a /SUSPEND_IN input of the CHG-IC 302. The /SUSPEND signal that is output from the load test circuit 303 conveys the USB connection destination detection result to the CHG-IC 302, and is used in input current control of the CHG-IC 302. The output (TRIG) of the AND 334 is connected to the input of a OneShotTimer-A 335. The OneShotTimer-A 335 outputs an H signal during a predetermined time period Ta, triggered by the input signal rising. In the OneShotTimer-A 335, the output signal does not change even if the input signal rises again during the predetermined time period Ta. Also, the OneShotTimer-A 335 stops the H signal output by a /RESET input (L signal is output).

The output (LOAD_EN) of the OneShotTimer-A 335 is connected to the inputs of an inverter 337 and a OneShotTimer-B 339. The output of the inverter 337 is connected to the input of an SW-L 382, and the SW-L 382 will be OFF when the output of the inverter 337 is H (LOAD_EN is L) and the SW-L 382 will be ON when the output of the inverter 337 is L (LOAD_EN is H). The SW-L 382 need only be an element that enters a conduction state when ON and enters a high impedance state when OFF, such as a PNP transistor or a P-Ch MOSFET. Drawing of a load current (LOAD_CURRENT) from the VBUS by an N-Ch MOSFET 396 will be performed while the SW-L 382 is ON (while LOAD_EN is H), and the load test will be implemented.

The OneShotTimer-B 339 outputs an H signal during a predetermined time period Tb, triggered by the input signal rising. In the OneShotTimer-B 339, the output signal does not change even if the input signal rises again during the predetermined time period Tb in which the H signal is output. The output (DATA_EN) of the OneShotTimer-B 339 is connected to the input of a DLY-A 340, a D input of a D-FF 341, and a D input of a D-FF 342. Here, the D-FFs are D flip-flop circuits. The DLY-A 340 delays the input by a predetermined time period Tda and outputs a signal. The output of the DLY-A 340 is connected to a CLK2 input of the D-FF 342. The output (Q1) of the D-FF 341 is connected to the input of an inverter 501. The output (BSEL) of the inverter 501 is connected to the input of the AND 502. The output (Q2) of the D-FF 342 is connected to the input of a DLY-C 343. The DLY-C 343 delays the input by a predetermined time period Tdc and outputs a signal.

The output (BSEL_EN) of the DLY-C 343 is connected to the input of the AND 502. The output (BOOTSEL) of the AND 502 is connected to a LIMSEL_IN input of the CHG-IC 302 and a BOOTSEL_IN input of the CPU 304.

The BOOTSEL signal that is output from the load test circuit 303 conveys the determination result of the power supply capability through a VBUS load test of the external device 401 to the CHG-IC 302 and the CPU 304. As is evident from FIG. 3B, the BOOTSEL signal changes to H if the voltage (VBUS_LEV) that is detected with the load test is greater than or equal to a voltage threshold (VREF_V), and BOOTSEL changes to L when the voltage that is detected with the load test drops to less than the voltage threshold. That is, in the case where the BOOTSEL signal is H, the external device 401 has a power supply capability that satisfies the standard of USB determined with USB connection destination detection. On the other hand, in the case where the BOOTSEL signal is L, the external device 401 does not have a power supply capability that satisfies the standard of USB determined with USB connection destination detection. The BOOTSEL signal output from the load test circuit 303 is input to the BOOTSEL_IN of the CPU 304, and used to permit or prohibit operations of the electronic device 301 using external power that is supplied from an external device via the VBUS. Also, the BOOTSEL signal is input to the LIMSEL_IN of the CHG-IC 302 and used in input current control of the CHG-IC 302.

The BOOTSEL signal is input to the AND 522 and startup of the CPU 304 using the button switch 318 (ON of VOT-2 output by the power source IC-B 312) is restricted. This is realized by the AND 521 and the AND 522 provided between the OR 319 and the button switch 318. The PWR_SW signal and the VBATT signal are connected to the input of the AND 521. The AND 521 outputs H in the case where the PWR_SW signal and the VBATT signal are both H, and turns ON the power source IC-B 312. In the case where the battery 320 is mounted in the electronic device 301, the CHG-IC 302 outputs the voltage of the battery 320 as VOUT_PWR. Therefore, ON and OFF of the power source IC-B 312, that is, ON and OFF of the main function of the CPU 304, is controllable with ON and OFF of the VBATT signal and the button switch 318.

The PWR_SW signal and the BOOTSEL signal are connected to the input of the AND 522. The AND 522 outputs H in the case where the PWR_SW signal and the BOOTSEL signal are both H, and turns ON the power source IC-B 312. Upon the external device 401 being connected to the electronic device 301, power supply capability determination by the current load test is performed by the load test circuit 303 based on the USB connection destination detection result, and the BOOTSEL signal is output. The CHG-IC 302 outputs, as VOUT_PWR, the VBUS voltage supplied from the external device 401. Therefore, if the BOOTSEL signal is H, ON and OFF of the power source IC-B 312, that is, ON and OFF of the main function of the CPU 304, can be controlled with ON and OFF of the button switch 318, even in a state where there is no supply of power other than external power. In the present embodiment, the state where there is no supply of power other than external power is a state in which VBATT is L, such as a state where the battery 320 is not mounted or a state where power supply from the battery 320 is insufficient, for example.

As described above, in the case where the BOOTSEL signal is H, the CPU 304 enters a permitted state in which execution of functions using external power is permitted, irrespective of whether there is supply of power other than external power. On the other hand, in the case where the BOOTSEL signal is L, the CPU 304 enters a prohibited state in which execution of functions using external power is prohibited. In the prohibited state, the main function of the CPU 304 cannot be started up in a state where there is no supply of power other than external power. In other words, the AND 522 can be said to be a circuit that sets the CPU 304 to a permitted state or a prohibited state, according to the input BOOTSEL signal.

Returning to description of the load test circuit 303, an IN+ input of a comparator 361 is a signal (VBUS_LEV) obtained by dividing the VBUS voltage with a resistor 363 and a resistor 364. An IN− input of the comparator 361 is a signal (VREF_V) obtained by dividing a reference voltage 362 using a resistor 373 and one of resistors 374, 375, 376 and 377. The comparator 361 compares the signals of the IN+ input and the IN− input, and outputs H, in the case where the signal of IN+ is larger and outputs L in the case where the signal of IN− is larger. The output (COMP_OUT) of the comparator 361 is connected to the input of an inverter 345, the input of a DLY-B 346, the input of the AND 334, and the input of an inverter 351.

The output of the inverter 345 is connected to a CLK1 input of the D-FF 341. The DLY-B 346 delays the input signal by a predetermined time period (time period: given as Tdb) and outputs the delayed signal. The output of the DLY-B 346 is connected to the /RESET input of the One-ShotTimer-A 335. The OneShotTimer-A 335 stops output in the case where the output of the DLY-B 346 is L (in the case where /RESET is L), and performs signal output again triggered by the input signal rising.

The connection of the resistor 375 to GND is turned ON and OFF with ON and OFF of a SW-1A 378. Similarly, the connections of the resistor 376 and the resistor 377 to GND are respectively turned ON and OFF with ON and OFF of a SW-2A 379 and a SW-3A 380. The SW-1A 378, the SW-2A 379 and the SW-3A 380 are elements that enter a conduction state when ON and enter a high impedance state when OFF, and are constituted by, for example, an NPN transistor or an N-Ch MOSFET. The SELSW-A 381 controls ON and OFF of the SW-1A 378, the SW-2A 379 and the SW-3A 380 according to the combination of USBDET_1 and USBDET_2 indicating the result of USB connection destination detection, and controls the voltage of VREF_V. Setting of a voltage threshold that depends on the result of USB connection destination detection is thereby realized.

The output of the inverter 351 is connected to a SW-V 352, and the SW-V 352 turns OFF when the output of the inverter 351 is H and the SW-V 352 turns ON when the output of the inverter 351 is L. The SW-V 352 is an element that enters a conduction state when ON and enters a high impedance state when OFF, and is constituted by, for example, a PNP transistor or a P-Ch MOSFET.

The voltage VBATT of the battery 320 is connected to the IN+ input of the comparator 353 via the SW-V 352. The connection between the IN+ input of a comparator 353 and VBATT is turned ON and OFF by ON and OFF of the SW-V 352. A voltage (VTH) by a reference voltage power source 354 is applied to the IN− input of the comparator 353. The comparator 353 compares the IN+ input and the IN− input, outputs H in the case where the IN+ input signal is larger, and outputs L in the case where the IN− input signal is larger. The output (VBATT_CP_OUT) of the comparator 353 is connected to the input of an inverter 503.

The output of the inverter 503 is connected to the input of an AND 504 together with the PWR_SW signal and the inverted value (output of an inverter 507) of and the BOOTSEL signal. Accordingly, the AND 504 outputs H in the case where BOOTSEL is L, PWR_SW is H and VBATT≤VTH. The output of the AND 504 is connected to the input of a flashing circuit 505. The flashing circuit 505 outputs a flash signal pattern for the period that the signal is input. The output of the flashing circuit 505 is connected to the input of an OR 506 together with a LED_OUT signal of the CPU 304. The output (LED_DRV) of the OR 506 is connected to the input of an SW-LD 513. The SW-LD 513 will be ON when the LED_DRV signal is H and will be OFF when the LED_DRV signal is L. The SW-LD 513 is an element that enters a conduction state when ON and enters a high impedance state when OFF, and can be constituted by, for example, an NPN transistor or an N-Ch MOSFET. An anode of a LED (light emitting diode) 512 is connected to VOUT_PWR via a resistor 511, and a cathode of the LED 512 is connected to GND via the SW-LD 513. ON and OFF of current flowing to the LED 512 is controlled by output of the OR 506, and lighting and extinguishing of the LED 512 is controlled. The LED 512 is used as an indicator indicating the operation state of the electronic device 301.

In the case where the PWR_SW signal is H, the BOOTSEL signal is L and VBATT≤VTH, the flashing circuit 505 outputs a flash signal pattern, and the LED 512 of the electronic device 301 flashes. That is, the electronic device 301 is able to indicate to the user by flashing of the LED 512 that operation without the battery 320 is "DISABLE".

The IN+ input of an operational amplifier 395 is a signal (VREF_I) obtained by dividing the reference voltage 362 with the resistors 383, 384, 385, 386 and 387. A capacitor 392 is connected between the IN+ input of the operational amplifier 395 and GND. The reference voltage 362 is connected to the resistor 383 via the SW-L 382. The input voltage signal VREF_I to IN+ of the operational amplifier 395 is turned ON and OFF by ON and OFF of the SW-L 382. A voltage signal that is generated by current flowing through a resistor 397 is input to IN− of the operational amplifier 395. The output of the operational amplifier 395 is connected to a gate of the N-Ch MOSFET 396, and current flowing from a drain to a source of the N-Ch MOSFET 396 is controlled by the output voltage of the operational amplifier 395. The drain of the N-Ch MOSFET 396 is connected to the VBUS and the source is connected to GND via the resistor 397. A VBUS load test current (LOAD_CURRENT) flows from the VBUS to the N-Ch MOSFET 396.

The operational amplifier 395, the N-Ch MOSFET 396 and the resistor 397 form a constant current circuit that controls the amount of current flowing from the VBUS to GND via the resistor 397 using the IN+ input voltage signal VREF_I of the operational amplifier 395. The abovementioned capacitor 392, in the case where the IN+ input voltage signal VREF_I of the operational amplifier 395 turns ON with ON of the SW-L 382, has a soft start effect of reducing the slew rate of the signal VREF_I and reducing the slew rate of the current flow. Note that the N-Ch MOSFET 396 is not limited to an N-Ch MOSFET, and may be any element capable of controlling the amount of current flowing from the VBUS to GND via the resistor 397 with voltage or current control, such as an NPN transistor.

The connection of the resistor 385 to GND is turned ON and OFF by ON and OFF of a SW-1B 388. Similarly, the connections of the resistor 386 and the resistor 387 to GND are respectively turned ON and OFF with ON and OFF of a SW-2B 389 and a SW-3B 390. A SW-1B 388, a SW-2B 389 and a SW-3B 390 are elements that enter a conduction state when ON and enter a high impedance state when OFF, and can be constituted by, for example, an NPN transistor or an N-Ch MOSFET. The SELSW-B 391 controls ON and OFF of the SW-1B 388, the SW-2B 389 and the SW-3B 390 by the combination of input signals USBDET_1 and USBDET_2. The voltage of VREF_I is thereby controlled according to the USB connection destination detection result. Setting of a load current that depends on the result of USB connection destination detection is thereby realized. Hereinabove, the block diagram of the electronic device 301 of FIGS. 3A and 3B was described.

Figure 1:
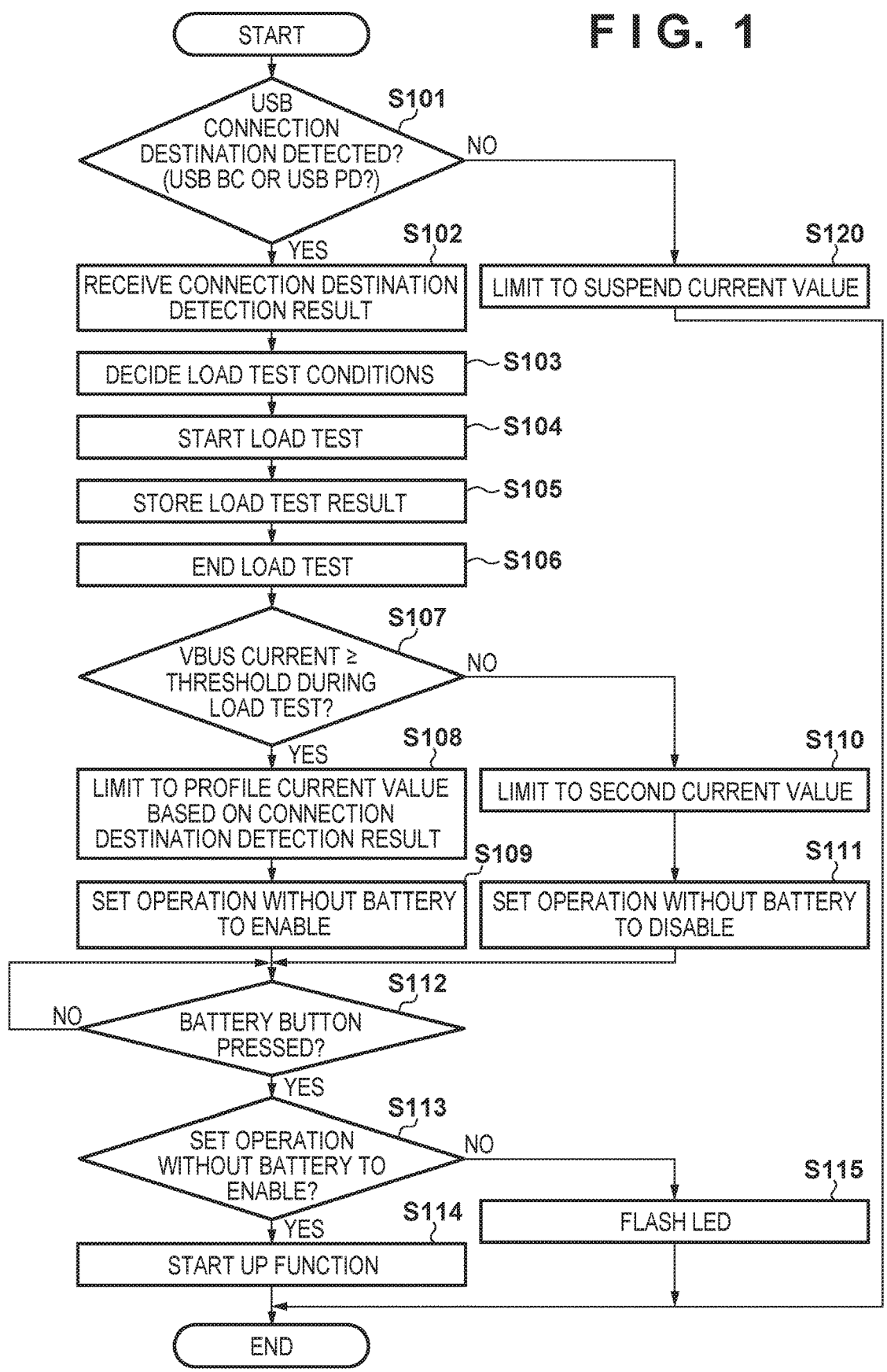
FIG. 1 is a flowchart showing operations by an electronic device of a first embodiment.

FIG. 1 is a flowchart showing an example of a procedure for the electronic device 301, in the case where the battery 320 is not mounted in the electronic device 301, to perform USB connection destination detection and determine whether to perform operations in the case where there is no supply of power other than external power. In the present embodiment, as described above, the state where there is no supply of power other than external power is, for example, a state where the battery 320 is not mounted or a state where the power supply from the battery 320 is insufficient. Although USB connection destination detection is executable by both the CHG-IC 302 and the CPU 304, in the flowchart of FIG. 1, description is given with USB connection destination detection being performed by the CHG-IC 302. The electronic device 301 controls a /SUSPEND signal to be L, in the case of the initial state, that is, a USB connection destination not being detected. Thus, the VBUS input current value limitation by the CHG-IC 302 is ISUSP=2.5 mA, where ISUSP is the SUSPEND current value.

Upon the external device 401 being connected to the USB connector 321, the CHG-IC 302 of the electronic device 301 executes USB connection destination detection, and determines the type of USB (step S101). USB connection destination detection involves detecting whether a partner apparatus connected to the USB connector 321 supports any of USB 2.0, USB 3.0, USB 3.1, USB BC and USB PD. In the case where a USB connection destination is not detected, that is, in the case where the USB connection destination detection result indicates unknown (NO at step S101), UDET_OUT_1A and UDET_OUT_2A remain at L. Accordingly, the load test circuit 303 controls the /SUSPEND signal to be L and the BOOTSEL signal to be L, and outputs these signals. On receipt thereof, the CHG-IC 302 limits the VBUS input current value limitation to ISUSP=2.5 mA (step S120), where ISUSP is the SUSPEND current value, and ends the flowchart of FIG. 1.

In the case where a USB connection destination is detected (YES at step S101), the load test circuit 303 of the electronic device 301 receives a connection destination detection result from the CPU 304 or the CHG-IC 302 (step S102). The connection destination detection result by the CHG-IC 302 is output from UDET_OTU_1A and UDET_OTU_2A. In the load test circuit 303, because at least one of the signals USBDET_1 and USBDET_2 will be set to H due to the connection destination detection result, the /SUSPEND signal is controlled to be H (OR 333), and the conditions of the VBUS load test are determined (step S103). The conditions of the VBUS load test are determined by the output state of the SELSW-A 381 and the SELSW-B 391 due to the USBDET_1 and USBDET_2 signals. In other words, the conditions of the VBUS load test are the value of the VBUS load test current (load current) that is determined by the value of VREF_I of the operational amplifier 395 of the load test circuit 303, and the value (voltage threshold) of the power supply capability determination level that is determined by the value of VREF_V of the comparator 361. In the present embodiment, the load current is given as being set to the rated current defined by a standard or a value approximating the rated current. Also, in the present embodiment, the voltage threshold is given as being set to a value that is 95% of the value of the rated voltage defined by a standard.

Upon the load test conditions being determined and the conditions being set in the load test circuit 303, the load test circuit 303 starts the VBUS load test (step S104). In the VBUS load test, a load current (LOAD_CURRENT) is drawn from the VBUS line and allowed to flow while LOAD_EN is being asserted to H, and it is tested whether the voltage on the VBUS line is maintained. In the present embodiment, it is determined whether the voltage on the VBUS line is maintained at greater than or equal to a voltage threshold. The load test circuit 303 then stores the result of the VBUS load test (step S105). Storage of the VBUS load test result is the state (Q1, Q2) of the D-FF 341 and the D-FF 342 that are stored using the DATA_EN signal and the COMP_OUT signal. Thereafter, the load test circuit 303 ends the VBUS load test (step S106).

Next, the electronic device 301 determines whether the VBUS voltage during the VBUS load test is greater than or equal to a voltage threshold from the stored VBUS load test result (step S107). Threshold determination of the VBUS voltage in step S107 is synonymous with determination by the logic of the BOOTSEL signal that is decided by the output states (Q1, Q2) of the D-FF 341 and the D-FF 342. In the case where the VBUS voltage is greater than or equal to the threshold in the load test, the load test circuit 303 controls the BOOTSEL signal to be H. In the case where the BOOTSEL signal is H (YES at step S107), the CHG-IC 302 sets the VBUS input current value limitation to the current value of a profile that depends on the USB connection destination detection result (step S108). For example, in the case where the USB connection destination detection result of the external device 401 is a current value of a 5V/1.5 A profile of the USB BC standard, the CHG-IC 302 limits the VBUS input current value limitation to I3=1.5 A. The electronic device 301 then sets operation without the battery 320 to "ENABLE" (step S109). Here, "without the battery 320" is a state in which the battery 320 is not mounted, or a state in which power supply from the battery 320 is insufficient. Also, "setting operation without the battery 320 to "ENABLE"" involves setting execution of functions using external power to a permitted state. In the present embodiment, such a permitted state is realized by setting the power source IC-B 312 to a state in which ON and OFF is possible according to H and L of the PWR_SW signal, as a result of the BOOTSEL signal that is input to the AND 522 changing to H.

On the other hand, in the case where it is determined with the load test that the VBUS voltage has dropped to less than the voltage threshold (NO at step S107), the load test circuit 303 controls the BOOTSEL signal to be L. The CHG-IC 302, in response to the BOOTSEL signal being L, limits the VBUS input current value limitation to I2=0.5 A, where I2 is a second current value, irrespective of the result of USB connection detection (step S110). For example, even in the case where the USB connection destination detection result of the external device 401 is a current value of a 5V/1.5 A profile of the USB BC standard, the VBUS input current value limitation of the CHG-IC 302 is set as I2=0.5 A. The electronic device 301 then sets operation without the battery 320 to "(DISABLE)" (sets execution of functions using external power to prohibited state) (S111). In the present embodiment, such a prohibited state is realized by setting a state in which OFF of the power source IC-B 312 is maintained irrespective of the PWR_SW signal, as a result of the BOOTSEL signal that is input to the AND 522 changing to L.

In the case where, after the processing of step S109 or step S111 is completed, the button switch 318 is pressed (YES at step S112) and operation without the battery 320 is set to ENABLE (YES at step S113), EN-2 of the power source IC-B 312 changes to H. The power source IC-B 312 thereby starts power supply to VDDIN_CPU of the CPU 304 from VOUT-2, and the CPU 304 starts up the main function and part of FUNCTION, and starts operation (step S114). The flowchart of FIG. 1 is then ended. The part of FUNCTION that is started up at step S114 is part or all of the FUNCTION-A 315, the FUNCTION-B 316 and the FUNCTION-C 317 of the electronic device 301. Because the power supply capability of the external device is correctly detected, the electronic device can be stably operated, by operating main function and FUNCTION in the range of current values limited at step S108.

In the case where operation without the battery 320 is set to DISABLE (NO at step S113), L of EN-2 of the power source IC-B 312 is maintained, and the power source IC-B 312 does not start power supply to VDDIN_CPU of the CPU 304. At this time, the load test circuit 303 causes the LED 512 to flash, and the electronic device 301 notifies that driving by external power is not possible (step S115). The flowchart of FIG. 1 is then ended.

Figure 2A:
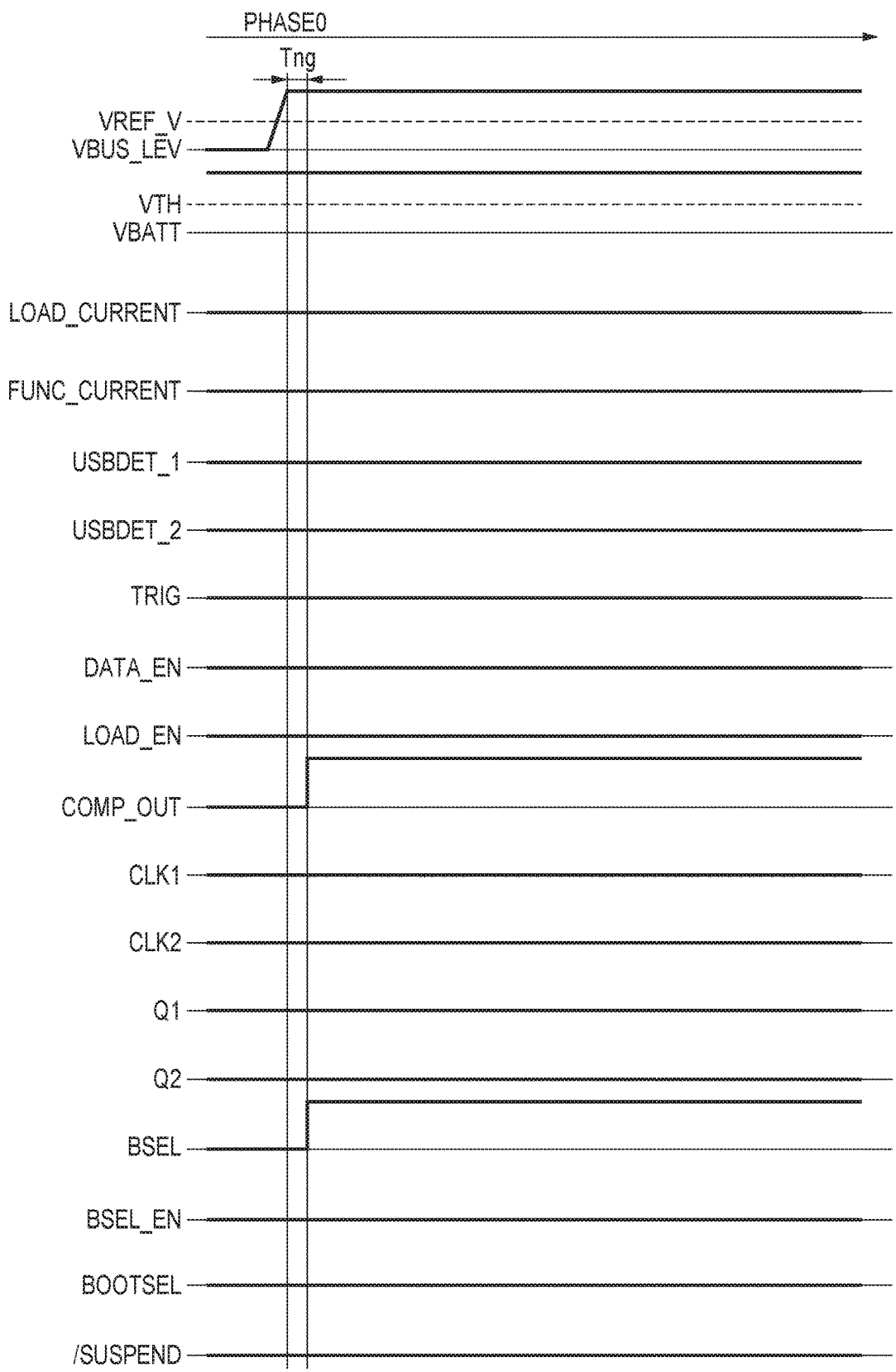
FIGS. 2A, 2B and 2C are timing charts of a load test circuit of the electronic device according to the first embodiment.
Figure 2B:
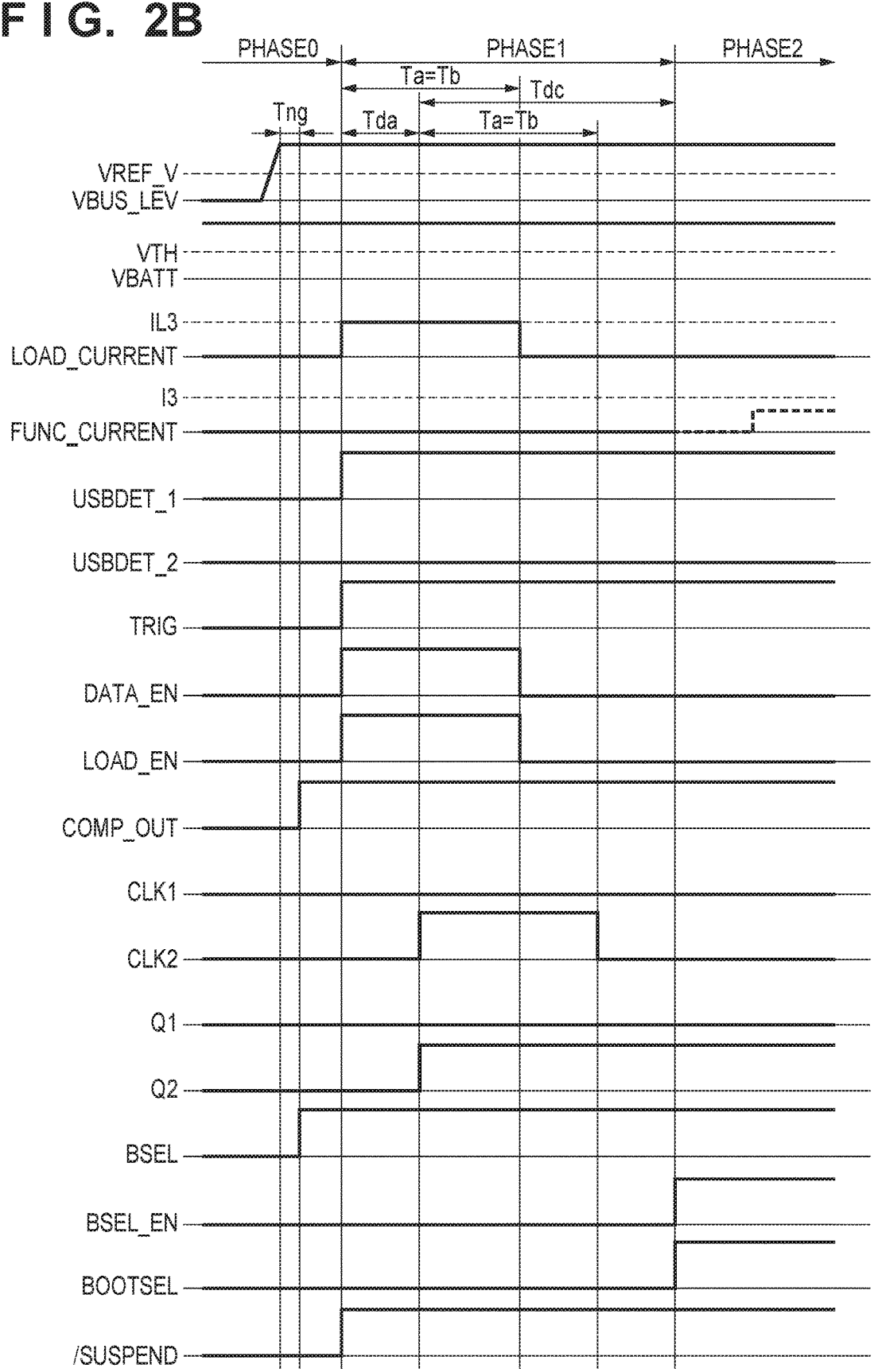
Figure 2C:
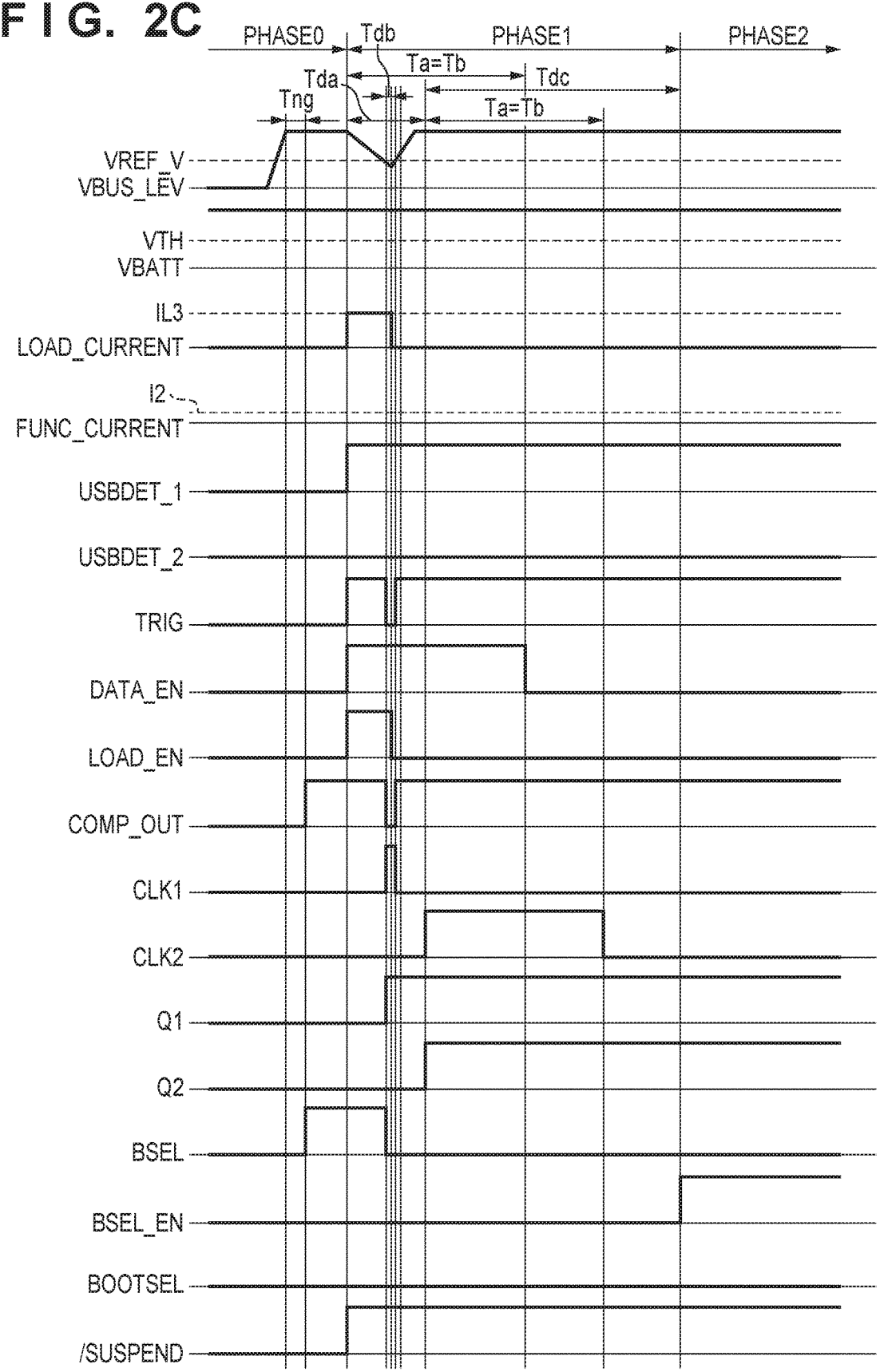

FIG. 2A to FIG. 2C are timing charts showing an example of a signal control procedure for performing power supply capability determination by the current load test in the load test circuit 303 of the electronic device 301 according to the present embodiment. In the timing charts of FIG. 2A to FIG. 2C, the period from when USB connection destination detection is performed until when the VBUS load test conditions are set is given as PHASE0, the period from when the VBUS load test is performed until when operating condition are decided is given as PHASE1, and the period during which the operating condition is effective is given as PHASE2. FIG. 4 is an example of a truth table of USB connection destination detection results and operating conditions of the electronic device 301 according to the present embodiment.

A timing chart showing an example of the signal control procedure in the case where the USB connection destination detection result is unknown in the flowchart of FIG. 1 and the flow passes through step S120 will be described using FIG. 2A. In FIG. 2A, the logic of the load test circuit 303 is negated for a predetermined time period Tng when the VBUS is supplied. If VBUS_LEV is greater than or equal to the threshold VREF_V after the time period Tng has elapsed, the COMP_OUT signal changes to H. Because the USB connection destination detection result is unknown, the USBDET_1 and USBDET_2 signals are both L in PHASE0. Since the VBUS load test is not performed in the case where both USBDET_1 and USBDET_2 signals are L, the TRIG, DATA_EN and LOAD_EN signals are also L, as shown in the truth table of FIG. 4. Therefore, the state of PHASE0 is maintained and the load test is not executed.

In the timing chart of FIG. 2A, the /SUSPEND and BOOTSEL signals also remain at L because of the load test not being executed. Therefore, the setting of operation without the battery 320 of the electronic device 301 will be DISABLE (prohibited state), and function current FUNC_CURRENT is zero. As shown in the truth table of FIG. 4, in PHASE0 of FIG. 2A, the setting of operation without the battery 320 of the electronic device 301 is DISABLE, and the VBUS input current value limitation of the CHG-IC 302 is ISUSP=2.5 mA, where ISUSP is the SUSPEND current value.

Next, a timing chart showing an example of the signal control procedure in the case where the USB connection destination detection result is validated in the flowchart of FIG. 1 and the flow passes through step S108 will be described using FIG. 2B.

In FIG. 2B, the logic of the load test circuit 303 is negated for the predetermined time period Tng when the VBUS is supplied. If VBUS_LEV is greater than or equal to the threshold VREF_V after the predetermined time period Tng elapses, the COMP_OUT signal changes to H. In the case where the USB connection destination detection result is validated, and the connection destination detection result indicates that the apparatus supports the USB BC standard, the USBDET_1 signal will be H, the USBDET_2 signal will be L and the /SUSPEND signal will be H in PHASE0. According to this, the TRIG, DATA_EN and LOAD_EN signals change to H, and the phase shifts to PHASE1. In PHASE1, the VBUS load test is performed for the period of Ta in which the LOAD_EN signal is H. Assuming that it is determined with the USB connection destination detection result that the connection destination is an external device 401 compatible with the USB BC standard, the VBUS load test current LOAD_CURRENT is set as IL3=approx. 1.5 A.

If VBUS_LEV is greater than or equal to the threshold VREF_V from the start to the end of the VBUS load test, the COMP_OUT signal is continuously output at H. In the example of the present embodiment, settings are configured such that VBUS_LEV will be greater than or equal to the threshold VREF_V in the case where the VBUS voltage is greater than or equal to 4.75V. Note that the present embodiment is not limited thereto, and the relationship between the VBUS voltage and the threshold VREF_V may be suitably set through the design of the electronic device 301, the CHG-IC 302 and the load test circuit 303.

The VBUS load test results in the period of Ta are stored in the D-FF 341 (Q1), and the history of the implementation of the VBUS load test is stored in the D-FF 342 (Q2). In PHASE1 of the timing chart of FIG. 2B, the BSEL signal is H, the BSEL_EN signal is L, and the /SUSPEND signal is H. At the point in time of PHASE1, the setting of operation without the battery 320 of the electronic device 301 is DISABLE, and the function current FUNC_CURRENT is zero. After the VBUS load test results are stored in the D-FF 341 and the history of implementation of the VBUS load test is stored in the D-FF 342, the DLY-C 343 transits BSEL_EN from L to H after a time period of Tdc, and shifts to PHASE2. The BOOTSEL signal also transits to H in response to the transit of BSEL_EN to H, and the setting of operation without the battery 320 changes to ENABLE (permitted state).

In the timing chart of FIG. 2B, the BOOTSEL signal is H in PHASE2, thus enabling the main function of the electronic device 301 to be started up by pressing the button switch 318, even in a state without the battery 320. In PHASE2 of FIG. 2B, it is possible to draw the function current FUNC_CURRENT under the limitation of I3=1.5 A, where I3 is the current value of the 5V/1.5 A profile of the USB BC standard, and to realize operation of the main function of the electronic device 301.

As shown in the row of the truth table of FIG. 4 that corresponds to the timing chart of PHASE2 in FIG. 2B, the setting of operation without the battery 320 is ENABLE and the VBUS input current value limitation of the CHG-IC 302 is I3=1.5 A, where I3 is the profile current value of the connection destination detection result.

Next, a timing chart showing an example of the signal control procedure in the case where the USB connection destination detection result is validated in the flowchart of FIG. 1 and the flow passes through step S110 will be described using FIG. 2C. In FIG. 2C, the logic of the load test circuit 303 is negated during the predetermined time period Tng when the VBUS is supplied. If VBUS_LEV is greater than or equal to the threshold VREF_V after the elapse of the predetermined time period Tng, the COMP_OUT signal changes to H. In the case where the USB connection destination detection result is validated and the connection destination detection result indicates that the apparatus supports the USB BC standard, the USBDET_1 signal will be H, the USBDET_2 signal will be L and the /SUSPEND signal will be H in PHASE0.

When the TRIG, DATA_EN and LOAD_EN signals change to H, the phase transits to PHASE1, and the VBUS load test is performed for the period that the LOAD_EN signal is output at H. Assuming that it is determined with the USB connection destination detection result that the connection destination is an external device 401 compatible with the USB BC standard, the VBUS load test current LOAD_CURRENT is set as IL3=approx. 1.5 A. When VBUS_LEV drops to less than the threshold VREF_V during the VBUS load test, the COMP_OUT signal is output at L. In the example of the present embodiment, settings are configured such that VBUS_LEV will be less than the threshold VREF_V in the case where the VBUS voltage is less than 4.75V. Note that the present embodiment is not limited thereto, and the relationship between the VBUS voltage and the threshold VREF_V may be suitably set through the design of the electronic device 301, the CHG-IC 302 and the load test circuit 303.

As a result of the COMP_OUT signal being output at L, the VBUS load test results are stored in the D-FF 341 (Q1). The OneShotTimer-A 335 then stops signal output by /RESET input, the LOAD_EN signal changes to L and the VBUS load test stops. The history of the VBUS load test implemented in the period of Ta is stored in the D-FF 342 (Q2).

In PHASE1 of the timing chart of FIG. 2C, the BSEL signal is L, the BSEL_EN signal is L, and the /SUSPEND signal is H. The setting of operation without the battery 320 of the electronic device 301 is DISABLE, and the function current FUNC_CURRENT is zero. After the VBUS load test results are stored in the D-FF 341 and the history of implementation of the VBUS load test is stored in the D-FF 342, the DLY-C 343 transits BSEL_EN from L to H after the elapse of the time period Tdc. Because the BOOTSEL signal remains at L, the setting of operation without the battery 320 of the electronic device 301 changes to DISABLE (prohibited state). In the timing chart of FIG. 2C, the BOOTSEL signal is L in PHASE2, and thus the main function of the electronic device 301 is not started up in the state without the battery 320 even if the button switch 318 is pushed. Therefore, the function current FUNC_CURRENT of the electronic device 301 is zero in PHASE2.

As shown in the row of the truth table of FIG. 4 that corresponds to PHASE2 in FIG. 2C, the setting of operation without the battery 320 of the electronic device 301 is DISABLE, and the VBUS input current value limitation of the CHG-IC 302 is I2=0.5 A, where I2 is the second current value.

Note that although, in the above, in the case where it is determined by USB connection destination detection that the external device 401 is USB BC compatible, 1.5 A, which is the maximum value of the USB BC standard, was set as the load current, which is a condition of the load test, the present invention is not limited thereto. For example, a configuration may be adopted in which a current value (≤1.5 A) required by the electronic device 301 is set as the load current.

As described above, in the above embodiment, USB connection destination detection for logically determining the power supply capability of the external device 401 is executed, the VBUS load test is executed under conditions set based on the detection result, and the actual power supply capability of the external device 401 is determined. In the case where the connection destination detection result matches the power supply capability, the execution of functions using external power is permitted, and the electronic device 301 is able to start operation on receipt of power supply from the external device 401 under power conditions that are based on the USB connection destination detection result, even in the state without the battery 320.

Therefore, according to the embodiment, the electronic device 301 is able to prevent the occurrence of function stop or an error caused by a drop in the VBUS voltage from the external device 401 that occurs due to a change in the function current, after starting operation in the state without the battery 320. Also, the occurrence of function stop or an error caused by a drop in the VBUS voltage that occurs due to the cable loss R-LOSS 405 on the VBUS line that exists in the USB interface cable 404 between the external device 401 and the electronic device 301 and a change in the function current can also be prevented.

In the above, the case was described where the current load test was performed in the load test circuit 303 under conditions (load current=1.5 A; voltage threshold=4.75V) conforming to the USB BC standard in the case where the external device was USB BC compatible, and whether to perform operations when there is no secondary battery was set. Hereinafter, operations in the case where the external device that is connected supports the USB PD standard will be further described.

FIG. 5A to FIG. 5D are timing charts showing an example of the signal control procedure for performing power supply capability determination by the current load test with the load test circuit 303 of the electronic device 301 according to the present embodiment. The timing charts of FIG. 5A to FIG. 5D show the period from when USB connection destination detection is performed until when VBUS load test conditions are set as PHASE0, the period from when the VBUS load test is performed until when the operating condition is decided as PHASE1, and the period during which functional operations of the electronic device 301 are performed as PHASE2. Also, in the lower half (state where USBDET_2 is H) of the truth table of FIG. 4, an example is shown in the case where the USB connection destination detection result of the electronic device 301 is USB PD. In the case of USB PD, PROFILE 1 (5V/2.0 A) or PROFILE 2 (12V/1.5 A) is further determined, and USBDET_1 is set as L or H according to the determination result.

Figure 5A:
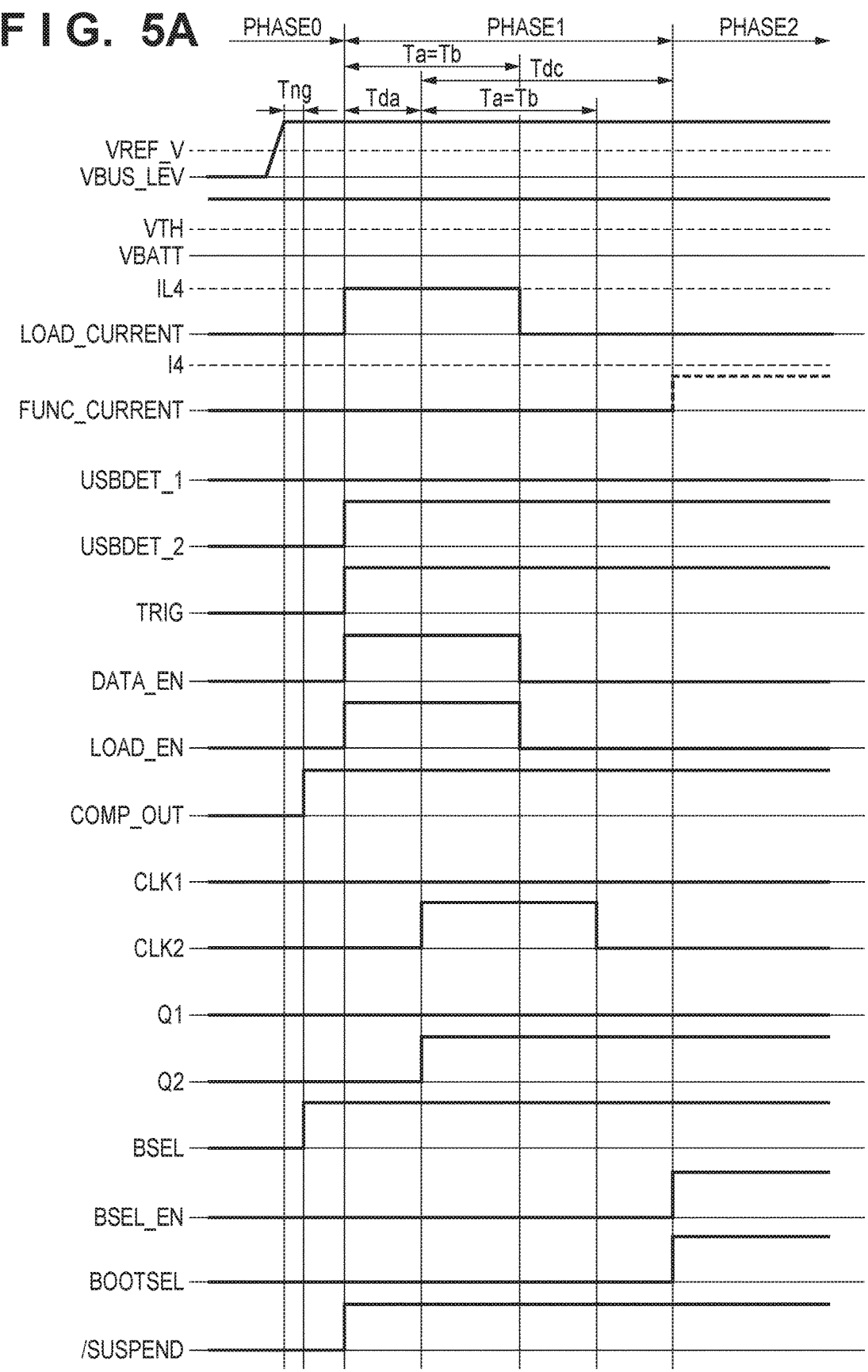
FIGS. 5A, 5B, 5C and 5D are timing charts of a load test circuit of the electronic device according to the first embodiment.

An example of the signal control procedure in the case where the USB connection destination detection result indicates an apparatus compatible with the 5V output of PROFILE 1 of the USB PD standard in the flowchart of FIG. 1 and the flow passes through step S108 will be described using the timing chart of FIG. 5A. In FIG. 5A, the logic of the load test circuit 303 is negated during the time period Tng when the VBUS is supplied. If VBUS_LEV is greater than or equal to the threshold VREF_V after the elapse of the time period Tng, the COMP_OUT signal changes to H.

In the case where the USB connection destination detection result indicates an apparatus compatible with the 5V output of PROFILE 1 of the USB PD standard, the USB-DET_1 signal will be L, the USBDET_2 signal will be L and the /SUSPEND signal will be H in PHASE0. Also, the TRIG, DATA_EN and LOAD_EN signals will be H, and the VBUS load test is performed for the period of Ta during which the LOAD_EN signal is output at H. Assuming that it is determined with the USB connection destination detection result that the external device 401 which is the connection destination is an apparatus compatible with the 5V output of PROFILE 1 of the USB PD standard, the load current LOAD_CURRENT is set as IL4=approx. 2.0 A.

If VBUS_LEV is greater than or equal to the threshold VREF_V during the period from the start to the end of the VBUS load test, the COMP_OUT signal is continuously output at H. In the example of the present embodiment, in the case where the VBUS voltage is greater than or equal to 4.75V, settings are configured such that VBUS_LEV will be greater than or equal to the threshold VREF_V. Note that the present embodiment is not limited thereto, and the relationship between the VBUS voltage and the threshold VREF_V may be suitably set through the design of the electronic device 301, the CHG-IC 302 and the load test circuit 303. Also, the VBUS load test results in the period of Ta are stored in the D-FF 341 and the history of the VBUS load test implemented is stored in the D-FF 342.

In PHASE1 of the timing chart of FIG. 5A, the BSEL signal is H, the BSEL_EN signal is L, and the /SUSPEND signal is H. At the point in time of PHASE1, the setting of operation without the battery 320 of the electronic device 301 is DISABLE (prohibited state), and the function current FUNC_CURRENT is zero. After the VBUS load test results are stored in the D-FF 341 and the history of implementation of the VBUS load test is stored in the D-FF 342, the DLY-C 343 transits BSEL_EN from L to H after the Tdc time period. As a result, the BOOTSEL signal transits to H, and the setting of operation without the battery 320 of the electronic device 301 will be ENABLE (PHASE2).

In the timing chart of FIG. 5A, the BOOTSEL signal is H in PHASE2, and thus it becomes possible to start up the main function of the electronic device 301 by pushing the button switch 318 in the state without the battery 320. Therefore, the electronic device 301, in PHASE2, can draw the function current FUNC_CURRENT under the limitation of I4=2.0 A, where I4 is the current value of 5V/2.0 A of PROFILE 1 of the USB PD standard, and can execute the main function operation.

As shown in the row of the truth table of FIG. 4 that corresponds to PHASE2 in FIG. 5A, the setting of operation without the battery 320 is ENABLE, and the VBUS input current value limitation of the CHG-IC 302 is I4=2.0 A, where I4 is the profile current value of the connection destination detection result.

Figure 5B:
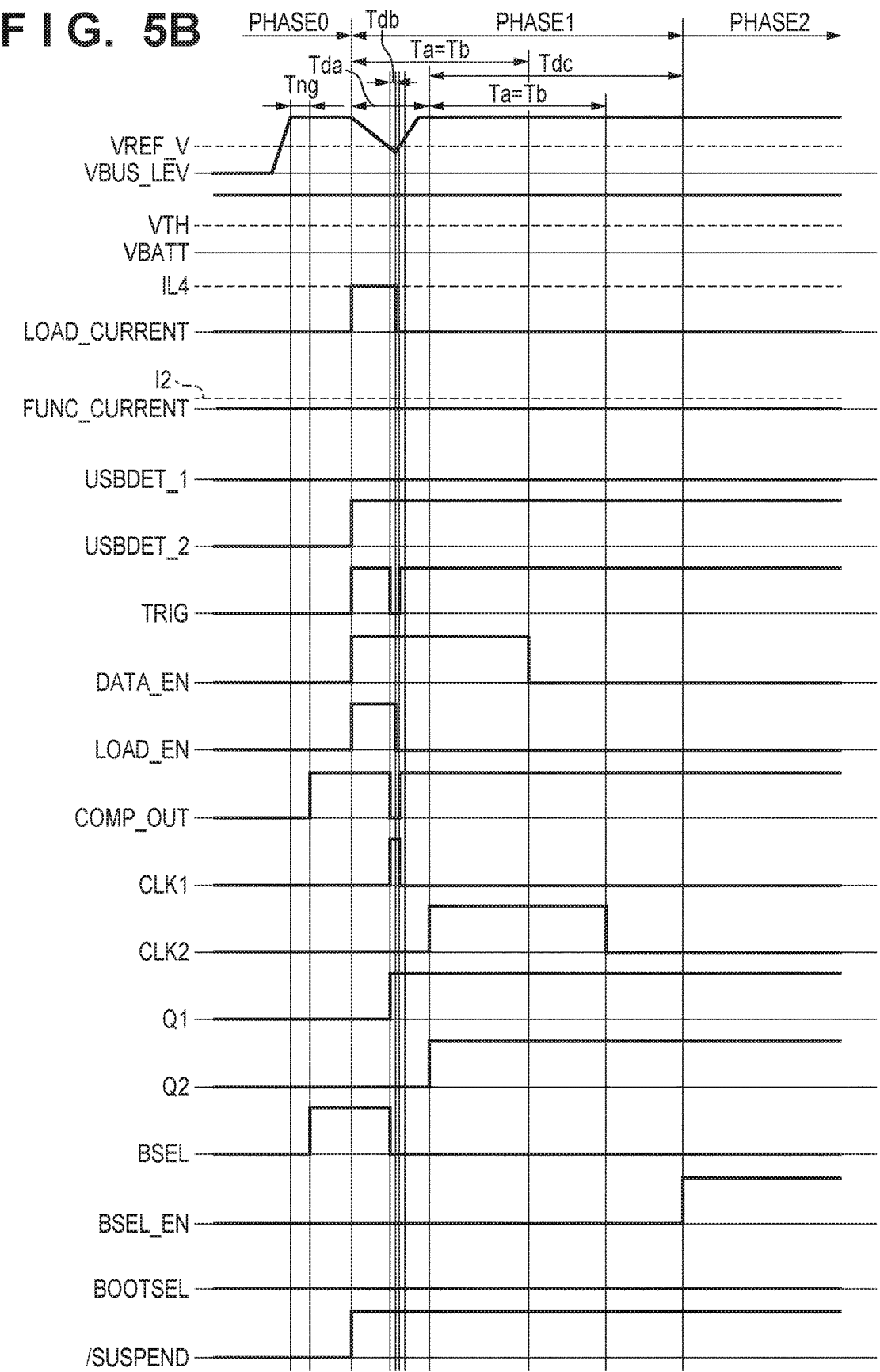

Next, an example of the signal control procedure in the case where the USB connection destination detection result indicates an apparatus compatible with the 5V output of PROFILE 1 of the USB PD standard in the flowchart of FIG. 1 and the flow passes through step S110 will be described using the timing chart of FIG. 5B. In FIG. 5B, the logic of the load test circuit 303 is negated during the predetermined time period Tng when the VBUS is supplied. If VBUS_LEV is greater than or equal to the threshold VREF_V after the elapse of the predetermined time period Tng, the COMP_OUT signal changes to H.

In the case where the USB connection destination detection result is validated and the connection destination detection result indicates an apparatus compatible with the 5V output of PROFILE 1 of the USB PD standard, the USB-DET_1 signal will be L, the USBDET_2 signal will be H and the /SUSPEND signal will be H in PHASE0. The TRIG, DATA_EN and LOAD_EN signals will be H, and the VBUS load test is performed for the period that the LOAD_EN signal is output at H. Assuming that it is determined with the USB connection destination detection result that the external device 401 which is the connection destination is an apparatus compatible with the 5V output of PROFILE 1 of the USB PD standard, the VBUS load test current LOAD_CURRENT will be set as the IL4=approx. 2.0 A.

When VBUS_LEV drops to less than the threshold VREF_V during the VBUS load test, the COMP_OUT signal is output at L. In the example of the present embodiment, settings are configured such that VBUS_LEV will be less than the threshold VREF_V in the case where the VBUS voltage is less than 4.75V. Note that the present embodiment is not limited thereto, and the relationship between the VBUS voltage and the threshold VREF_V may be suitably set through the design of the electronic device 301, the CHG-IC 302 and the load test circuit 303. As a result of the COMP_OUT signal being output at L, the VBUS load test results are stored in the D-FF 341. The LOAD_EN signal changes to L when the OneShotTimer-A 335 stops signal output by /RESET input, and the VBUS load test stops. The history of the VBUS load test implemented in the period of Ta is stored in the D-FF 342.

In PHASE1 of the timing chart of FIG. 5B, the BSEL signal is L, the BSEL_EN signal is L, and the /SUSPEND signal is H. The setting of operation without the battery 320 of the electronic device 301 is DISABLE, and the function current FUNC_CURRENT is zero. After the VBUS load test results are stored in the D-FF 341 and the history of implementation of the VBUS load test is stored in the D-FF 342, the DLY-C 343 transits BSEL_EN from L to H after the Tdc time period. Since the BSEL signal is L, the BOOTSEL signal remains at L, and the setting of operation without the battery 320 of the electronic device 301 changes to DISABLE (prohibited state). Because the BOOTSEL signal is L in PHASE2, the main function of the electronic device 301 is not started up in the state without the battery 320 even if the button switch 318 is pushed. Therefore, the function current FUNC_CURRENT of the electronic device 301 is zero in PHASE2.

As shown in the row of the truth table of connection destination detection results and operating conditions of FIG. 4 that corresponds to the timing chart of PHASE2 in FIG. 5B, the setting of operation without the battery 320 is DISABLE, and the VBUS input current value limitation of the CHG-IC 302 is I2=0.5 A, where I2 is the second current value.

Figure 5C:
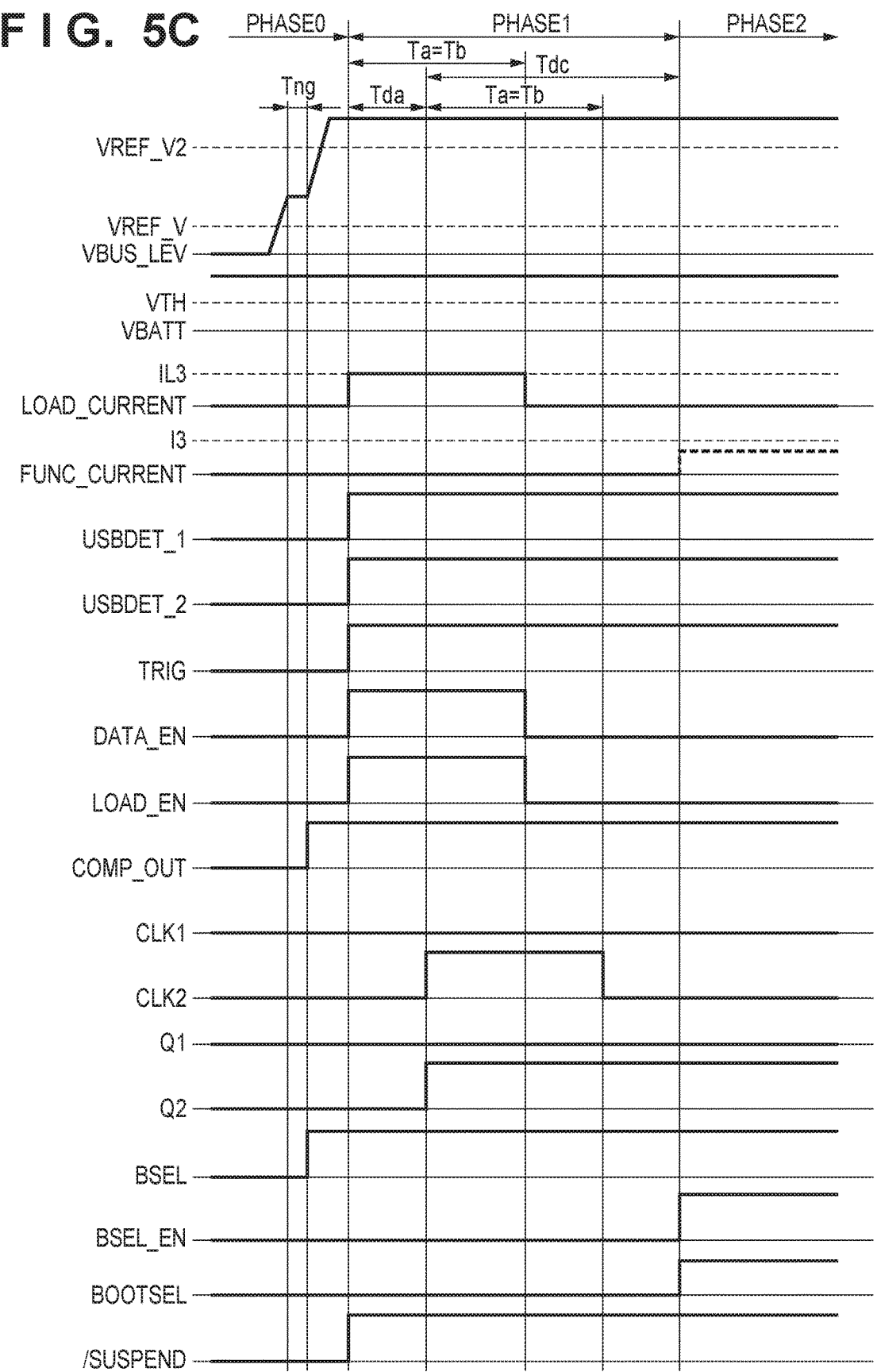

Next, an example of the signal control procedure in the case where the USB connection destination detection result indicates an apparatus compatible with the 12V output of PROFILE 2 of the USB PD standard in the flowchart of FIG. 1 and the flow passes through step S108 will be described using the timing chart of FIG. 5C. In FIG. 5C, the logic of the load test circuit 303 is negated during the predetermined time period Tng when the VBUS is supplied. If VBUS_LEV is greater than or equal to the threshold VREF_V after the elapse of the predetermined time period Tng, the COMP_OUT signal changes to H.

In the case where the USB connection destination detection result indicates an apparatus compatible with the 12V output of PROFILE 2 of the USB PD standard, the VBUS voltage is set to 12V corresponding to PROFILE 2 of the USB PD standard in PHASE0. Also, the USBDET_1 signal will be H, the USBDET_2 signal will be H, and the /SUSPEND signal will be H. The TRIG, DATA_EN and LOAD_EN signals will be H, and the VBUS load test is performed for the period of Ta during which the LOAD_EN signal is output at H.

It is assumed that it is determined with USB connection destination detection result that the external device 401, which is the connection destination, is an apparatus compatible with the 12V output of PROFILE 2 of the USB PD standard. In that case, the voltage threshold of VBUS_LEV is set to VREF_V2 (e.g., 11.4V), and the load current LOAD_CURRENT is set as IL3=approx. 1.5 A.

If VBUS_LEV is greater than or equal to the threshold VREF_V from the start to the end of the VBUS load test, the COMP_OUT signal is continuously output at H. In the example of the present embodiment, it is determined that VBUS_LEV is greater than or equal to the threshold VREF_V2 in the case where the VBUS voltage is greater than or equal to 11.4V. Note that the present embodiment is not limited thereto, and the relationship between the VBUS voltage and the threshold VREF_V2 may be suitably set through the design of the electronic device 301, the CHG-IC 302 and the load test circuit 303. The VBUS load test results are stored in the D-FF 341 in the period of Ta, and the history of implementation of the VBUS load test is stored in the D-FF 342.

In PHASE1 of the timing chart of FIG. 5C, the BSEL signal is H, the BSEL_EN signal is L, and the /SUSPEND signal is H. At the point in time of PHASE1, the setting of operation without the battery 320 of the electronic device 301 is DISABLE, and the function current FUNC_CURRENT is zero. After the VBUS load test results are stored in the D-FF 341 and the history of implementation of the VBUS load test is stored in the D-FF 342, the DLY-C 343 transits BSEL_EN from L to H after the Tdc time period. Because the BSEL signal is maintained at H, the BOOTSEL signal transits to H in accordance with BSEL_EN transiting from L to H, and the setting of operation without the battery 320 of the electronic device 301 changes to ENABLE.

In the timing chart of FIG. 5C, the BOOTSEL signal is H in PHASE2, and thus it becomes possible to start up the main function of the electronic device 301 by pushing the button switch 318, even in the state without the battery 320. Therefore, in PHASE2, the function current FUNC_CURRENT is drawn under the limitation of I3=1.5 A, where I3 is the current value of 12V/1.5 A of PROFILE 2 of the USB PD standard, and main function operation is possible for the electronic device 301.

As shown in the row of the truth table of FIG. 4 that corresponds to the timing chart of PHASE2 in FIG. 5C, the setting of operation without the battery 320 is ENABLE, and the VBUS input current value limitation of the CHG-IC 302 is I3=1.5 A, where I3 is the profile current value of the connection destination detection result.

Figure 5D:
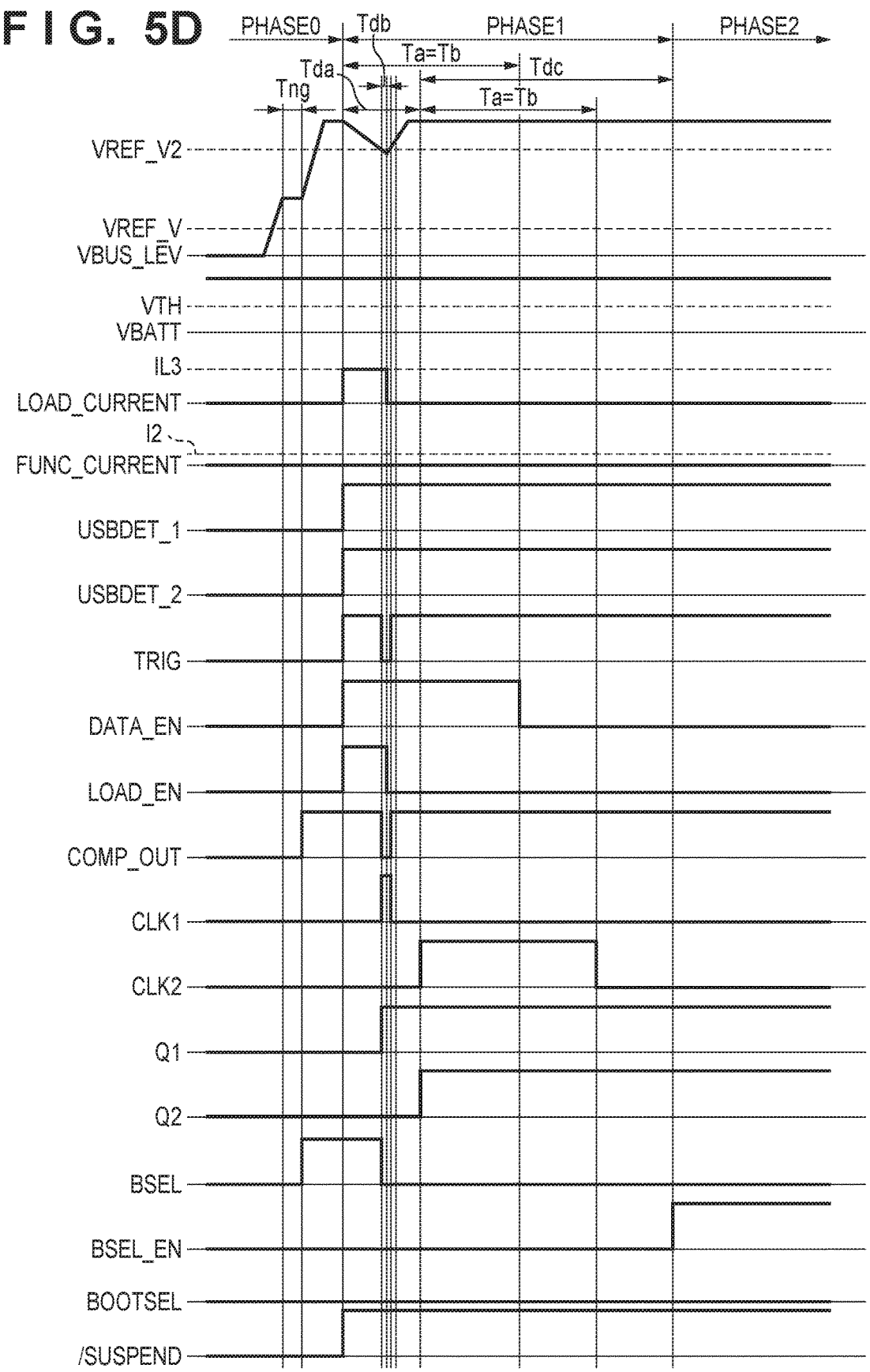

Next, an example of the signal control procedure in the case where the USB connection destination detection result indicates an apparatus compatible with the 12V output of PROFILE 2 of the USB PD standard in the flowchart of FIG. 1 and the flow passes through step S110 will be described using the timing chart of FIG. 5D. In FIG. 5D, the logic of the load test circuit 303 is negated during the predetermined time period Tng when the VBUS is supplied. If VBUS_LEV is greater than or equal to the threshold VREF_V after the elapse of the predetermined time period Tng, the COMP_OUT signal changes to H.

In the case where the USB connection destination detection result indicates an apparatus compatible with the 12V output of PROFILE 2 of the USB PD standard, the VBUS voltage is set to 12V corresponding to the 12V output of PROFILE 2 of the USB PD standard in PHASE0. Also, the USBDET_1 signal will be H, the USBDET_2 signal will be H, and the /SUSPEND signal will be H. Also, the TRIG, DATA_EN and LOAD_EN signals will be H, and the VBUS load test is performed for the period that the LOAD_EN signal is output at H.

The voltage threshold VBUS_LEV is set as threshold VREF_V2=11.4V, and the load current LOAD_CURRENT is set as IL3=approx. 1.5 A. When VBUS_LEV drops to less than the threshold VREF_V2 during the VBUS load test, the COMP_OUT signal is output at L. In the example of the present embodiment, settings are configured such that VBUS_LEV will be less than the threshold VREF_V2 in the case where the VBUS voltage is less than 11.4V. Note that the present embodiment is not limited thereto, and the relationship between the VBUS voltage and the threshold VREF_V2 may be suitably set through the design of the electronic device 301, the CHG-IC 302 and the load test circuit 303.

As a result of the COMP_OUT signal being output at L, the VBUS load test results are stored in the D-FF 341. The OneShotTimer-A 335 then stops signal output by /RESET input, the LOAD_EN signal changes to L and the VBUS load test stops. The history of the VBUS load test implemented in the period of Ta is stored in the D-FF 342.

In PHASE1 of the timing chart of FIG. 5D, the BSEL signal is L, the BSEL_EN signal is L, and the /SUSPEND signal is H. The setting of operation without the battery 320 of the electronic device 301 is DISABLE, and the function current FUNC_CURRENT is zero. After the VBUS load test results are stored in the D-FF 341 and the history of implementation of the VBUS load test is stored in the D-FF 342, the DLY-C 343 transits BSEL_EN from L to H after the Tdc time period. Since BSEL is L, the BOOTSEL signal remains at L, and the setting of operation without the battery 320 of the electronic device 301 changes to DISABLE. In the case where the BOOTSEL signal is L in PHASE2, the main function of the electronic device 301 does not start up in the state without the battery 320 even if the button switch 318 is pushed. Therefore, the function current FUNC_CURRENT of the electronic device 301 is zero in PHASE2.

As shown in the row of the truth table of connection destination detection results and operating conditions of FIG. 4 that corresponds to the timing chart of PHASE2 in FIG. 5D, the setting of operation without the battery 320 is DISABLE, and the VBUS input current value limitation of the CHG-IC 302 is I2=0.5 A, where I2 is the second current value.

According to the present embodiment, as described above, the electronic device 301 performs USB connection destination detection with external power from the external device 401, and logically determines the power supply capability of the external device 401. The electronic device 301 then determines whether the external device 401 is capable of supply power at a power supply capability that depends on the logically determined power supply capability of the external device 401. Specifically, the electronic device 301 sets the voltage threshold and the load current of the VBUS load test based on the USB connection destination detection result, and determines the actual power supply capability of the external device 401 through the VBUS load test. In the case where the electronic device 301 determines that the external device 401 is capable of power supply at a power supply capability that depends on the logically determined power supply capability of the external device 401, the electronic device 301 configures settings so as to enable execution of functions, using power supplied from the external device 401 under power conditions that are based on the USB connection destination detection result. By this power supply, the electronic device 301 is able to start operations in the state without the battery 320.

In other words, the electronic device 301 of the present embodiment can be said to decide whether it is possible to start operations, using power supplied from the external device 401, according to the power supply capability of the external device 401.

In accordance with the present embodiment, the electronic device 301 is able to perform appropriate the VBUS load test in correspondence with a plurality of power supply standards. Furthermore, it is also possible to extend the logic number of signals for performing USB connection destination detection, and to also extend the setting number of the values of VREF_V and VREF_I. In that case, it is also possible to support standards other than PROFILE 1 of the USB BC standard and the USB PD standard and PROFILE 2 of the USB PD standard described in the present embodiment. For example, settings may be configured to support the following standards, depending on the USB connection destination detection result.

Apparatus compliant with the USB BC standard and compatible up to 5V/1.5 A

Apparatus supporting 5V/2.0 A output of PROFILE 1 of the USB PD standard

Apparatus supporting 5V/2.0 A output of PROFILE 2 of the USB PD standard

Apparatus supporting 12V/1.5 A output of PROFILE 2 of the USB PD standard

Apparatus supporting 5V/2.0 A output of USB PD standard PROFILE 3

Apparatus supporting 12V/3.0 A output of USB PD standard PROFILE 3

Apparatus supporting 5V/2.0 A output of USB PD standard PROFILE 4

Apparatus supporting 12V/3.0 A output of USB PD standard PROFILE 4

Apparatus supporting 20V/3.0 A output of USB PD standard PROFILE 4

Apparatus supporting 5V/2.0 A output of USB PD standard PROFILE 5

Apparatus supporting 12V/5.0 A output of USB PD standard PROFILE 5

Apparatus supporting 20V/5.0 A output of USB PD standard PROFILE 5.

However, in order to identify the above 12 types, four signals (4 bits) are needed in USBDET. The SELSW-A 381 and the SELSW-B 391 respectively switch the value of VREF_V and the value of VREF_I according to the input of these four signals, and set load conditions (voltage threshold and load current value) that depend on the detected standard.

Second Embodiment

In the first embodiment, the case where the current load test is performed in a state where the main function and FUNCTION of the CPU are not operating, and whether operation of the main function of the CPU without a secondary battery is possible is set was described. For example, when an external device is connected in a state where a secondary battery is not mounted, the current load test will be performed in a state where the main function and FUNCTION of the CPU are not operating. In the second embodiment, the case where the current load test is performed in response to an external device being connected in a state where the secondary battery of the electronic device is mounted and the main function and FUNCTION of the CPU are operating, and whether operation without the secondary battery is possible (permitted state/prohibited state) is set will be described.

Figure 6:
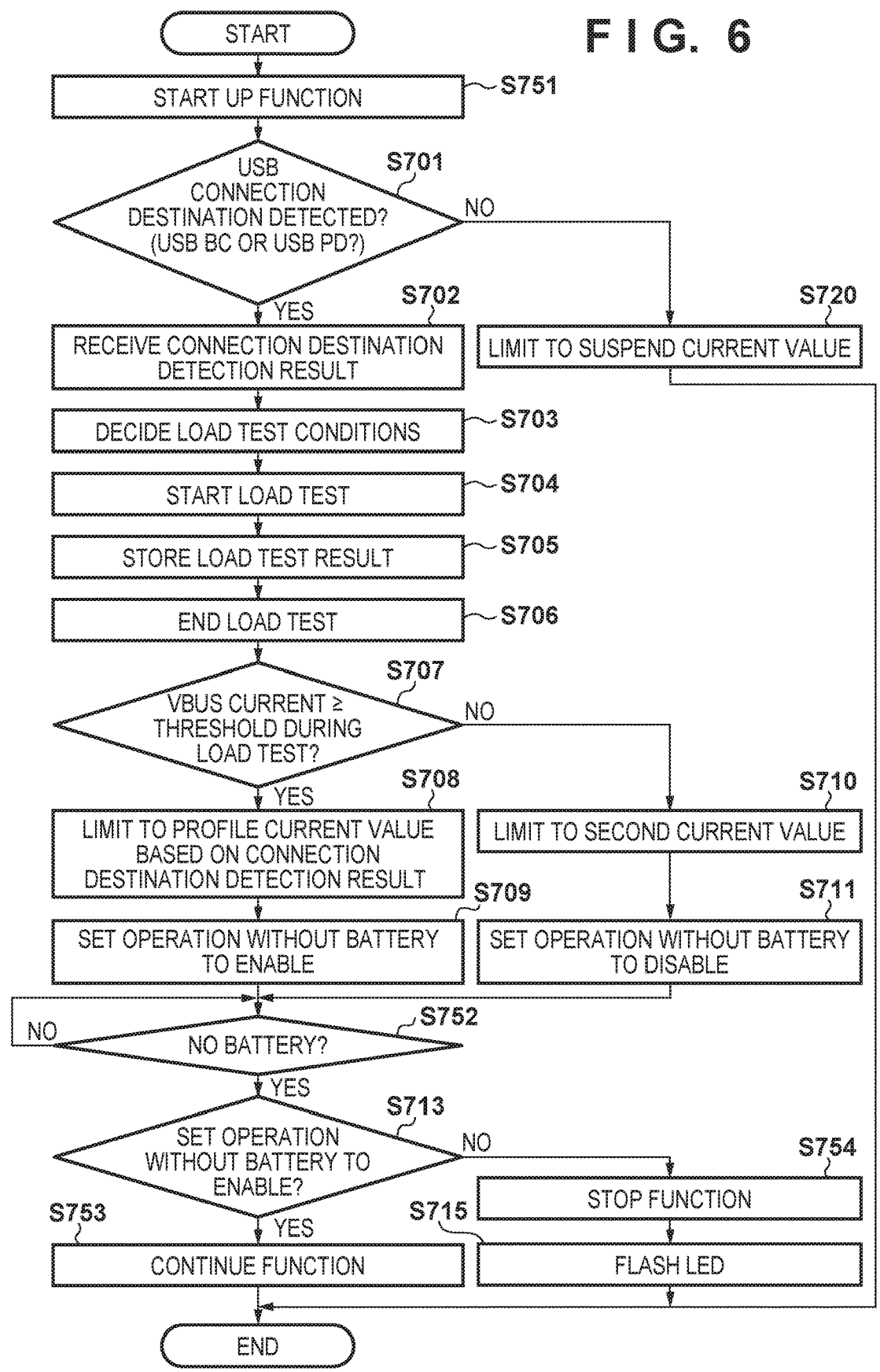
FIG. 6 is a flowchart showing operations by an electronic device according to a second embodiment.

A block diagram showing an exemplary configuration of the electronic device 301 according to the second embodiment is similar to the first embodiment (FIG. 3A, FIG. 3B). FIG. 6 is a flowchart showing an example of a procedure for the electronic device 301 to perform USB connection destination detection and determine operation without the battery 320, while the battery 320 is mounted in the electronic device 301 and the main function of the CPU is being executed. Although USB connection destination detection according to the second embodiment is possible with both of the CHG-IC 302 and the CPU 304, the flowchart of FIG. 6 will be described with USB connection destination detection being performed by the CPU 304.

Because the electronic device 301 controls the /SUSPEND signal to be L in the case where an initial state, that is, a USB connection destination has not yet been detected, the VBUS input current value limitation of the CHG-IC 302 is limited to ISUSP=2.5 mA, where ISUSP is the SUSPEND current value.

The electronic device 301 starts the main function of the CPU 304, and part or all of the FUNCTION-A 315, the FUNCTION-B 316 and the FUNCTION-C 317 (step S751). Upon the external device 401 being connected to the USB connector 321, the CPU 304 executes USB connection destination detection (step S701). In the case where a USB connection destination is not detected, that is, in the case where the USB connection destination detection result indicates unknown (NO at step S701), the load test circuit 303 controls the /SUSPEND signal to be L and the BOOTSEL signal to be L. The CHG-IC 302 thereby limits the VBUS input current value limitation to ISUSP=2.5 mA, where ISUSP is the SUSPEND current value (step S720), and the flowchart of FIG. 6 is ended.

In the case where a USB connection destination is detected (YES at step S701), the load test circuit 303 receives the USB connection destination detection result from the CPU 304 by the UDET_OUT_1B and UDET_OUT_2B signals (step S702). The load test circuit 303 then controls the /SUSPEND signal to be H, and decides the conditions (voltage threshold and load current) for the VBUS load test according to the type of the detected USB (step S703). Similarly to the first embodiment, the conditions of the VBUS load test are decided by the output state of the SELSW-A 381 and the SELSW-B 391 that depends on the USBDET_1 and USBDET_2 signals. The conditions of the VBUS load test are the value (load current) of the VBUS load test current that is decided by the value of VREF_I of the operational amplifier 395 of the load test circuit 303, and the value (voltage threshold) of the power supply capability determination level that is decided by the value of VREF_V of the comparator 361.

Next, the electronic device 301 starts the VBUS load test (step S704). In the VBUS load test, the load current is drawn from the VBUS line while LOAD_EN of the load test circuit 303 is being asserted to H, and it is checked whether the voltage of the VBUS is greater than or equal to the voltage threshold. The load test circuit 303 stores the VBUS load test result (step S705). Storage of the VBUS load test result refers to the states (Q1, Q2) of the D-FF 341 and the D-FF 342 that are stored in the DATA_EN signal and the COMP_OUT signal. The load test circuit 303 then ends the VBUS load test (step S706).

The CHG-IC 302 determines whether the VBUS voltage during the VBUS load test is greater than or equal to a threshold from the stored VBUS load test result (step S707). The threshold determination of the VBUS voltage is synonymous with determination by the logic of the BOOTSEL signal that is decided by the output states of the D-FF 341 and the D-FF 342. Hereinafter, a more detailed description will be given.

In the case where the VBUS is greater than or equal to the voltage threshold in the USB load test, the load test circuit 303 sets the BOOTSEL signal to H. The CHG-IC 302, in the case where the BOOTSEL signal is H (YES at step S707), sets the VBUS input current value limitation to the current value of the profile of the USB standard detected by USB connection destination detection (step S708). For example, in the case where the USB connection destination detection result of the external device 401 is the current value of the 5V/1.5 A profile of the USB BC standard, the CHG-IC 302 sets the VBUS input current value limitation as I3=1.5 A. The electronic device 301 sets operation without the battery 320 to ENABLE (permitted state) (step S709). This, as the first embodiment described, is realized by the BOOTSEL signal, which is the input of the AND 522, being set to H.

On the other hand, in the case where it is determined in the USB load test that the VBUS voltage is less than the voltage threshold (NO at step S707), the load test circuit 303 sets the BOOTSEL signal to L. The CHG-IC 302 sets the VBUS input current value limitation as I2=0.5 A, where I2 is the second current value, in response to the BOOTSEL signal being L (step S710). For example, even in the case where the USB connection destination detection result of the external device 401 is the current value of the 5V/1.5 A profile of the USB BC standard, the VBUS input current value of the CHG-IC 302 is limited to I2=0.5 A. The electronic device 301 sets operation without the battery 320 to DISABLE (step S711). In the present embodiment, since the BOOTSEL signal of the input of the AND 522 is set to L, EN-2 of the power source IC-B 312 is maintained at L and the power source IC-B 312 does not operate, irrespective of L and H of the PWR_SW signal, which is another input of the AND 522.

When the processing of step S709 or step S711 ends, the CPU 304 of the electronic device 301 determines whether the battery 320 has been removed (step S752). In the case where the battery 320 has not been removed (NO at step S752), processing of step S752 is repeated. In the case where the battery 320 has been removed and operation without the battery 320 is set to ENABLE, the electronic device 301 continues operation of the main function and FUNCTION of the CPU 304 (YES at step S752; YES at step S713; step S753). The flowchart of FIG. 6 is then ended. The FUNCTION that continues operation at step S753 is part or all of the FUNCTION-A 315, the FUNCTION-B 316 and the FUNCTION-C 317 of the electronic device 301.

On the other hand, in the case where operation without the battery 320 is set to DISABLE, the electronic device 301 stops operation of the main function and FUNCTION that are being executed by the CPU 304 (NO at step S713; step S754). The load test circuit 303 then flashes the LED 512 and notifies that fact. The flowchart of FIG. 6 is then ended.

Timing charts showing an example of the signal control procedure for performing power supply capability determination by the current load test with the load test circuit 303 of the electronic device 301 according to the present embodiment is similar to the timing charts of FIGS. 2A to 2C and FIGS. 5A to 5D of the first embodiment. Also, an example of the truth table of USB connection destination detection results and operating condition of the electronic device 301 according to the present embodiment is similar to the truth table of FIG. 4 described in the first embodiment.

Hereinabove, in the second embodiment, operations in the case where the external device 401 is connected in a state where the battery 320 is mounted in the electronic device 301 and the main function and FUNCTION of the CPU 304 are operating was described. The electronic device 301 decides the permitted state/prohibited state of continuation of operations in the case where the battery 320 has been removed, through comparison of the result of USB connection destination detection executed according to connection of the external device 401 and the actual determination result of power supply capability. In the case where the result of comparison indicates that both match, the permitted state in which operations are continued on receipt of power supply from the external device 401 under power conditions that are based on the USB connection destination detection result is set even in the state without the battery 320. On the other hand, if both do not match, the prohibited state in which the main function and FUNCTION are stopped when the state without the battery 320 is entered is set. In accordance with the present embodiment, even in the state changes from a state in which the battery 320 is mounted in the electronic device 301 and the main function and FUNCTION are operating to a state in which the battery 320 is removed, operations of the main function and FUNCTION can be continued safely using external power. Note that it is also possible to perform control in the present embodiment so as to support a plurality of power supply standards, like in the first embodiment.

Third Embodiment

In the first embodiment and the second embodiment, description was given with examples in which the operations of the load test circuit of the electronic device were all performed with hardware sequence control. A third embodiment describes a configuration in which part of the operations of the load test circuit of the electronic device are performed with software sequence control by a different CPU from the CPU 304.

Figure 7:
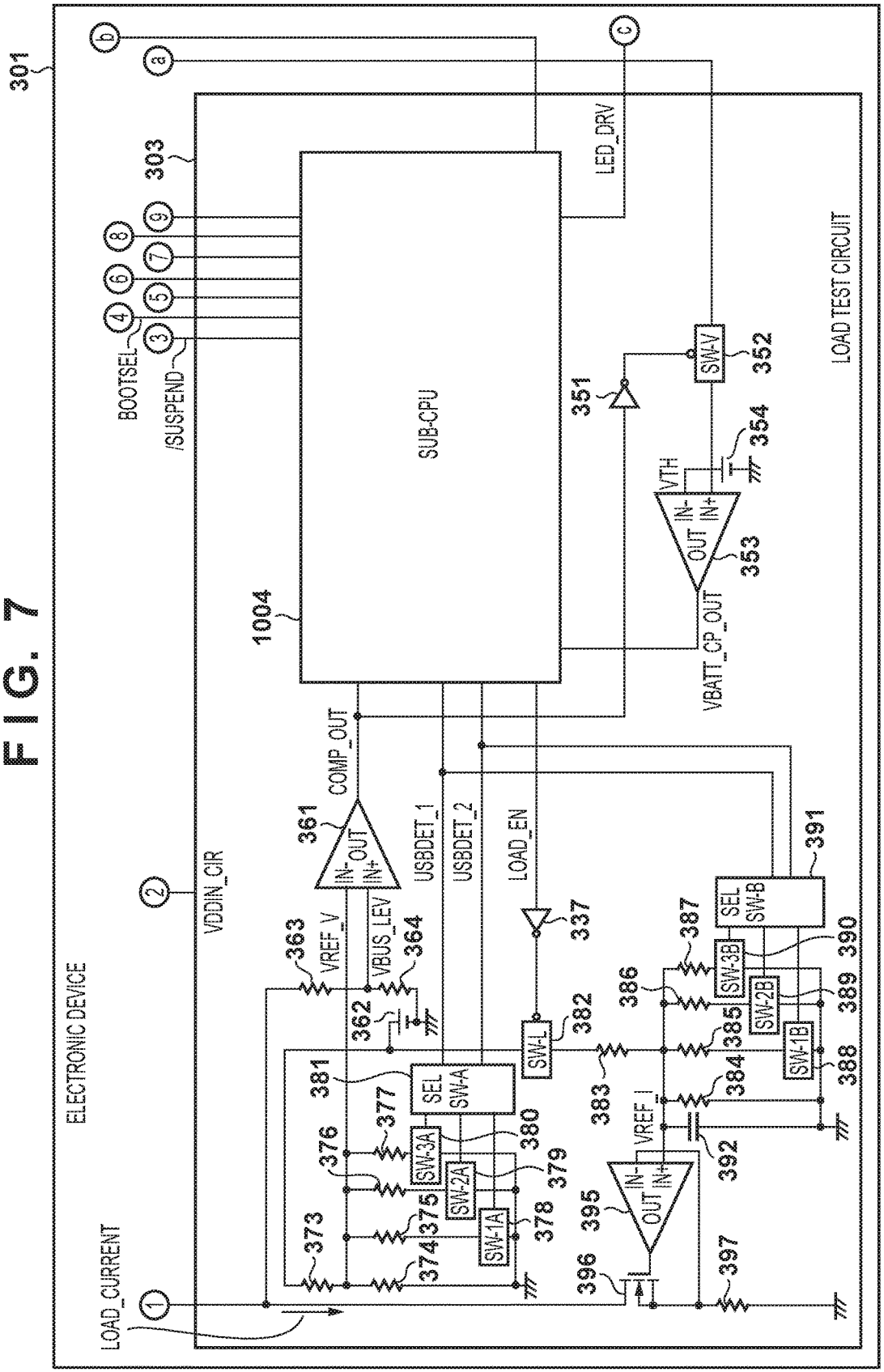
FIG. 7 is a block diagram showing an exemplary configuration of an electronic device according to a third embodiment.

FIG. 7 is a block diagram showing an exemplary configuration of the electronic device 301 according to the third embodiment. In the block diagram used in description of the present embodiment, power source connections to blocks that are not required in description of the present embodiment are omitted. Also, a detailed description of blocks and operations not required in description of the present embodiment is omitted.

In FIG. 7, a SUB-CPU 1004 realizes the functions of circuits constituting the hardware sequence control of the load test circuit 303 described in FIG. 3B of the first embodiment by software sequence control. The SUB-CPU 1004 is provided separately to the CPU 304. The configurations of the load test circuit 303 of the electronic device 301 according to the third embodiment and the load test circuit 303 (FIG. 3B) of the electronic device 301 described in the first embodiment perform similar operations from the perspective of the CPU 304 and the CHG-IC 302.

The power source of the SUB-CPU 1004 is obtained from the output VOUT-1 of the same power source IC-A 311 as the power source VDDIN_CIR of the entire load test circuit 303. Accordingly, in the case where the VBUS of the external device 401 is connected, power is constantly supplied to the SUB-CPU 1004. In the case where supply is started from a state in which the power source VDDIN_CIR of the entire load test circuit 303 is not being supplied, the logic of the SUB-CPU 1004 is given as being set to an initial state to negate functions thereof. Also, the functions of the SUB-CPU 1004 are given as being negated, in the case where supply is ended from a state in which the power source VDDIN_CIR of the entire load test circuit 303 is being supplied. Note that description of the transient state of each circuit that is not required in description according to the present embodiment is omitted.

The SUB-CPU 1004 may receive the USB connection destination detection result from either the CPU 304 or the CHG-IC 302. The USB connection destination detection result of the CPU 304 is output from UDET_OUT_1B and UDET_OUT_2B of the CPU 304, and received with the SUB-CPU 1004. The USB connection destination detection result of the CHG-IC 302 is output from UDET_OUT_1A and UDET_OUT_2A of the CHG-IC 302, and received with the SUB-CPU 1004.

The LED_OUT signal that is output from the CPU 304, the COMP_OUT signal that is output from the comparator 361 and the VBATT_CP_OUT signal that is output from the comparator 353 are received with the SUB-CPU 1004. The first LOAD_EN signal that is output from the SUB-CPU 1004 is input to the inverter 337. The USBDET_1 and USBDET_2 signals that are output from the SUB-CPU 1004 are input to the SELSW-A 381 and the SELSW-B 391. The LED_DRV signal that is output from the SUB-CPU 1004 is input as a control signal of the SW-LD 513. The /SUSPEND signal that is output from the SUB-CPU 1004 is input to /SUSPEND_IN of the CHG-IC 302. The BOOTSEL signal that is output from the SUB-CPU 1004 is input to the LIMSEL_IN input of the CHG-IC 302, and the BOOTSEL_IN of the CPU 304.

In the load test circuit 303 of the electronic device 301 of FIG. 7 according to the present embodiment, a portion excluding the part of the hardware circuit operation of the load test circuit 303 of the electronic device 301 of FIG. 3B that is replaced with the software control of the SUB-CPU 1004 performs similar operations. Therefore, the procedure shown in the flowchart of FIG. 1 of the first embodiment and the procedure shown in the flowchart of FIG. 6 of the second embodiment are applicable to a procedure for the electronic device 301 according to the third embodiment to perform USB connection destination detection and determine operation without the battery 320.

In the case of applying the flowchart of FIG. 1, in the example of the signal control procedure and the example of the operating condition in the load test circuit 303 according to the present embodiment, the timing charts of FIGS. 2A to 2C together with the truth table of FIG. 4 and the timing charts of FIGS. 5A to 5D together with the truth table of FIG. 4 are applied. Similarly, in the case of applying the flowchart of FIG. 6, in the example of the signal control procedure and the example of operating condition in the load test circuit 303 according to the present embodiment, the timing charts of FIGS. 2A to 2C together with the truth table of FIG. 4 and the timing charts of FIGS. 5A to 5D together with the truth table of FIG. 4 are applied.

According to the third embodiment, as described above, it is possible to implement the VBUS load test based on the USB connection destination detection result, even if the load test circuit of the electronic device is software sequence control rather than hardware sequence control. The actual power supply capability of the external device 401 is then determined through the VBUS load test, similarly to the first and second embodiments. In the case where the connection destination detection result matches power supply capability determination result, the electronic device 301 is able to receive power supply from the external device 401 under power conditions that are based on the connection destination detection result, and operate in a state without the battery 320.

Other Embodiments

In the first embodiment to the third embodiment, a configuration using the 2 bits of the USBDET_1 and USBDET_2 signals as signals for determining the USB connection destination detection result as signals for determining the USB connection destination detection result was used as a specific example. However, the signals for determining the USB connection destination detection result to which the present invention applicable are not limited to 2 bits, and a configuration may be adopted in which the signals for determining the USB connection destination detection result are converted to multi-value signals to increase the types of applicable USB connection destinations. In this regard, an example in which extension is implemented so as to use 4 bits, in the case for determining 12 types in the first embodiment, is shown. In that case, a configuration is desirably adopted in which the signal levels of VREF_V and VREF_I are also similarly converted to multi-value levels in correspondence with the types of USB connection destinations.

Also, although, in the first embodiment to the third embodiment, description was given in which signal transfer between the CPU and CHG-IC and the load test circuit was performed with parallel signals as an example, the signals to which the present invention is applicable are not limited to the parallel signals. For example, a configuration may also be adopted in which signal transfer between the CPU and CHG-IC and the load test circuit is performed with serial signals. In that case, a general-purpose serial communication standard such as two lines or three lines is favorably used as a serial signal.

Also, although, in the first embodiment to the third embodiment, execution of functions using external power was permitted in the case where the connection destination detection result matches the power supply capability, operations in the case where the connection destination detection result matches the power supply capability are not limited thereto. For example, it is also possible for the CPU 304 to control the CHG-IC 302, in the case where the connection destination detection result matches the power supply capability, to receive power from the external device with power that depends on the logically determined power supply capability, and to charge the battery 320.

Also, in the case where the power supply capability of the external device 401 obtained by the load test is lower than the logically determined power supply capability of the external device 401, the CPU 304 may control the CHG-IC 302 to charge the battery 320, with the power supply capability obtained by the load test. For example, it is possible for the load test circuit 303 to determine the current value at which the voltage does not drop, by executing the load test with a plurality of conditions.

By performing processing as abovementioned, in the case where, for example, the output voltage of the battery 320 is insufficient for operation of the CPU 304 immediately after connecting to the external device 401, and power suppliable by the external device 401 is lower than the logically determined power supply capability, it becomes possible to charge the battery 320 with power suppliable by the external device 401. In response to the output voltage of the battery 320 becoming greater than or equal to a predetermined voltage, it is possible for the CPU 304 to operate using power of the battery 320.

In the first and second embodiments, description was given in which use of hardware circuits as an example for performing the load test was taken as an example, and, in the third embodiment, description was given in which use of a CPU as an example for performing the load test was taken as an example. However, load test circuit control to which the present invention is applicable is not limited to hardware circuits or a CPU. For example, the present invention is applicable even when a reconfigurable IC such as a FPGA (Field-Programmable Gate Array) or a PLD (Programmable Logic Device) is used. Also, the present invention is applicable even when a non-reconfigurable IC such as an ASIC (Application Specific Integrated Circuit) is used.

Various modes in a range that does not depart from the spirit of the invention are also embraced in the invention, and parts of the aforementioned embodiments may be combined as appropriate.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-164061, filed Aug. 24, 2016, which is hereby incorporated by reference herein in its entirety.

What is claimed is:

1. An electronic device comprising:
   a connector configured to connect to an external device by cable and receive external power from the external device;
   at least one processor and/or at least one circuit to perform operations of the following units:
      a first determination unit configured to logically determine a power supply capability of the external device connected to the connector;
      a condition setting unit configured to set a load current and a voltage threshold, based on the power supply capability logically determined by the first determination unit;
      a test unit configured to execute a load test for detecting a voltage supplied from the external device while drawing the load current from the external device via the connector;
      a second determination unit configured to determine whether the external device is capable of power supply at a power supply capability that depends on the power supply capability logically determined by the first determination unit;
      a control unit configured to execute a predetermined function using the external power, according to an operation state that is set; and
      a setting unit configured, in a case where the second determination unit determines that the external device is capable of power supply at the power supply capability that depends on the power supply capability logically determined by the first determination unit, to set, in the control unit, a permitted state in which the predetermined function can be executed using the external power, and, if not the case, to set, in the control unit, a prohibited state in which the predetermined function cannot be executed using the external power,
   wherein the second determination unit, in a case where the voltage detected with the load test is greater than or equal to the voltage threshold, determines that the external device is capable of supply power at the power supply capability that depends on the power supply capability logically determined by the first determination unit, and, if not the case, determines that the external device is not capable of supply power at the power supply capability that depends on the power supply capability logically determined by the first determination unit.

2. The electronic device according to claim 1, wherein the condition setting unit sets a rated current corresponding to the power supply capability logically determined by the first determination unit as the load current, and sets the voltage threshold based on a rated voltage corresponding to the power supply capability logically determined by the first determination unit.

3. The electronic device according to claim 1, wherein the at least one processor and/or the at least one circuit further performs the operations of:
   a unit configured, in a case where the voltage detected with the load test is greater than or equal to the voltage threshold, to set a current value limitation of the external power to a first current value, and, in a case where the voltage detected with the load test is less than the voltage threshold, to set the current value limitation of the external power to a second current value that is smaller than the first current value.

4. The electronic device according to claim 1, wherein the test unit continues drawing the load current for a predetermined time period or until the voltage detected by the load test is less than the voltage threshold.

5. The electronic device according to claim 1,
wherein the control unit:
in a case where the second determination unit determines that the external device is capable of supply power at the power supply capability that depends on the power supply capability logically determined by the first determination unit, starts execution of the predetermined function in response to a predetermined operation, irrespective of whether there is supply of power other than the external power, and
in a case where the second determination unit determines that the external device is not capable of supply power at the power supply capability that depends on the power supply capability logically determined by the first determination unit, and there is no power supply other than the external power, does not execute the predetermined function in response to the predetermined operation.

6. The electronic device according to claim 5, wherein the at least one processor and/or the at least one circuit further performs the operations of:
a notification unit configured, in a case where the second determination unit determines that the external device is not capable of supply power at the power supply capability that depends on the power supply capability logically determined by the first determination unit, and there is no supply of power other than the external power, to notify that execution of the predetermined function cannot be started in response to the predetermined operation.

7. The electronic device according to claim 5,
wherein a state in which there is no power supply other than the external power is a state in which a secondary battery is not mounted or a state in which power supply from the secondary battery to the control unit is insufficient.

8. The electronic device according to claim 1,
wherein the control unit, in a case of the prohibited state, stops the predetermined function when a state in which power other than the external power is insufficient is entered, during execution of the predetermined function with power other than the external power.

9. The electronic device according to claim 8,
wherein a state in which power other than the external power is insufficient is a state in which a secondary battery has been removed or a state in which power supply from the secondary battery is insufficient.

10. The electronic device according to claim 8, wherein the at least one processor and/or the at least one circuit further performs the operations of:
a notification unit configured to perform a notification, in a case where a state in which the control unit stops the predetermined function is entered.

11. The electronic device according to claim 1,
wherein, until the setting unit sets the permitted state in the control unit, the control unit does not execute the predetermined function using the external power.

12. The electronic device according to claim 1,
wherein the first determination unit, the second determination unit and the setting unit function in response to the external device being connected to the connector.

13. The electronic device according to claim 1,
wherein, in a case where logical determination of the power supply capability of the external device by the first determination unit cannot be performed, the current value limitation of the external power is set to 2.5 mA which is a SUSPEND current value of USB.

14. The electronic device according to claim 1, wherein the at least one processor and/or the at least one circuit further performs the operations of:
a power control unit configured to charge a secondary battery and to receive power from the secondary battery,
wherein, in a case where the second determination unit determines that the external device is not capable of power supply at the power supply capability that depends on the power supply capability logically determined by the first determination unit, the power control unit starts charging the secondary battery using the external power.

15. An electronic device comprising:
a connector configured to connect to an external device by cable and receive external power from the external device; and
at least one processor and/or at least one circuit to perform operations of the following units:
a control unit configured to execute a predetermined function using the external power;
a condition setting unit configured to set a load current and a voltage threshold for determining whether the external device has a predetermined power supply capability;
a test unit configured to execute a load test for detecting a voltage supplied from the external device while drawing the load current from the external device via the connector;
a determination unit configured to, in a case where the voltage detected with the load test is greater than or equal to the voltage threshold, determine that the external device has the predetermined power supply capability, and, if not the case, to determine that the external device does not have the predetermined power supply capability; and
a decision unit configured to decide whether the control unit is capable of executing the predetermined function using the external power, based on whether the external device has the predetermined power supply capability.

16. A control method for an electronic device including a connector configured to connect to an external device by cable and receive external power from the external device, and at least one processor and/or at least one circuit, wherein the method is performed by the at least one processor and/or the at least one circuit, and the control method comprises
logically determining a power supply capability of the external device connected to the connector;
setting a load current and a voltage threshold, based on the logically determined power supply;
executing a load test for detecting a voltage supplied from the external device while drawing the load current from the external device via the connector;
determining whether the external device is capable of power supply at a power supply capability that depends on the logically determined power supply capability, wherein, in a case where the voltage detected with the load test is greater than or equal to the voltage threshold, it is determined that the external device is capable of supply power at the power supply capability that depends on the logically determined power supply capability, and, if not the case, it is determines that the external device is not capable of supply power at the power supply capability that depends on the logically determined power supply capability; and in a case where it is determined that the external device is capable of power supply at the power supply capability that depends on the logically determined power supply capability, setting a permitted state in which the predetermined function can be executed using the external power, and, if not the case, setting a prohibited state in which the predetermined function cannot be executed using the external power.

17. A control method for an electronic device including a connector configured to connect to an external device by cable and receive external power from the external device and at least one processor and/or at least one circuit, wherein the method is performed by the at least one processor and/or the at least one circuit and the method comprises:

setting a load current and a voltage threshold for determining whether the external device has a predetermined power supply capability;

executing a load test for detecting a voltage supplied from the external device while drawing the load current from the external device via the connector;

in a case where the voltage detected with the load test is greater than or equal to the voltage threshold, determining that the external device has the predetermined power supply capability, and, if not the case, determining that the external device does not have the predetermined power supply capability; and deciding whether a predetermined function can be executed using the external power, based on whether the external device has the predetermined power supply capability.

* * * * *